United States Patent [19]

Yamamoto et al.

[11] Patent Number: 5,306,754
[45] Date of Patent: Apr. 26, 1994

[54] POLYAMIDE RESIN COMPOSITION AND CONNECTOR

[75] Inventors: Sanehiro Yamamoto; Kazuto Sugiyama; Akinori Toyota; Yoshikatsu Amimoto; Fumitoshi Ikejiri, all of Yamaguchi; Tetsuo Kato; Masahiro Kanda, both of Haibara, all of Japan

[73] Assignees: Mitsui Petrochemical Industries, Ltd.; Yazaki Corporation, both of Tokyo, Japan

[21] Appl. No.: 32,864

[22] Filed: Mar. 17, 1993

[30] Foreign Application Priority Data

Mar. 19, 1992 [JP] Japan .................................. 4-064089
Dec. 25, 1992 [JP] Japan .................................. 4-347189

[51] Int. Cl.$^5$ .............................................. C08K 13/00
[52] U.S. Cl. ................................. 524/289; 524/291; 524/322; 524/302
[58] Field of Search ............... 525/66, 432; 524/302, 524/222, 291, 606, 289; 528/347

[56] References Cited

U.S. PATENT DOCUMENTS

| | | | |
|---|---|---|---|
| 3,677,965 | 7/1972 | Dexter et al. | 524/222 |
| 3,772,403 | 11/1973 | Wells | 260/857 |
| 4,410,661 | 10/1983 | Epstein et al. | 525/66 |
| 4,576,734 | 3/1986 | Ishii et al. | 524/302 |
| 4,795,782 | 1/1989 | Lutz et al. | 525/66 |
| 5,071,924 | 12/1991 | Koch et al. | 525/432 |
| 5,183,843 | 2/1993 | Sakai et al. | 524/606 |
| 5,216,054 | 6/1993 | Iwanami et al. | 524/222 |

OTHER PUBLICATIONS

Patent Abstracts of Japan, vol. 006, No. 219 (C-132), Nov. 2, 1982 Abstract of JP-A-57 123 254.
Patent Abstracts of Japan, vol. 014, No. 513 (C-0777), Nov. 9, 1990 Abstract of JP-A-02 212 533.

Primary Examiner—Veronica P. Hoke
Attorney, Agent, or Firm—Sherman and Shalloway

[57] ABSTRACT

The resin composition of the invention comprises as resin components specific aromatic polyamide (A), a specific graft-modified polymer (B), an aliphatic polyamide (C), and plural antioxidants comprising a hindered phenol type antioxidant (D) having a molecular weight of not less than 500 and a TGA 10% weight loss temperature of not lower than 300° C. and a sulfur type antioxidant (E) having a molecular weight of not less than 600 and a TGA 10% weight loss temperature of not lower than 280° C. The connector of the invention has housing formed from the above-mentioned resin composition. The resin composition of the invention shows excellent heat resistance. The connector of the invention is lightweight and is excellent in heat resistance, water resistance and chemical resistance.

10 Claims, 2 Drawing Sheets

POLYAMIDE RESIN COMPOSITION AND CONNECTOR

FIELD OF THE INVENTION

The present invention relates to a thermoplastic resin composition of excellent heat resistance and a connector having housing formed from this thermoplastic resin composition. More particularly, the invention relates to a lightweight thermoplastic resin composition which is hardly reduced in toughness even after heating and is hardly reduced in heat resistance for a long period of time, and also relates to a connector having housing formed from this thermoplastic resin composition, particularly a connector suitable for automobile.

BACKGROUND OF THE INVENTION

Connectors used as connecting terminals of electrical circuits have been conventionally formed from thermosetting resins such as phenol resin, but in these years, thermoplastic resins having high moldability have come to be used instead of the thermosetting resins. Further, the connectors have come to be used not only under mild conditions such as conditions within OA machine, for example, as connectors of electric devices, but also under extremely severe conditions such as those within an automotive engine room. Therefore, the connectors used under the severe conditions such as those within an automotive engine room are required to have extremely high heat resistance. In addition, the connectors are required to have such new features that they are hardly changed in their properties even after repeated heating due to engine heating and that they are hardly changed in their properties even if they are brought into contact with water, oil, etc.

Furthermore, under the world-wide proposal of efficient utilization of petroleum energy, it has been studied to make more lightweight automobiles for the purpose of reducing fuel cost of automobiles and it has been also studied to develop small sized automotive parts.

As the thermoplastic resins for connectors, there have been conventionally used poypropylene (PP), aliphatic polyamide (NY) such as polycapramide (nylon 6, NY 6) or polyhexamethylene adipamide (nylon 66, NY 66), polyphenylene ether (PPE) and acrylonitrile/-butadiene/styrene resin (ABS resin).

In these thermoplastic resins, PP is insufficient in heat resistance and low in rigidity as the resin for a connector used under severe conditions. Moreover, PP has such a problem that the rate of crystallization is slow. PPE has a certain level of heat resistance, but it is low in chemical resistance, particularly oil resistance, so that PPE is unsuitable as a resin for a connector used near machines such as an engine room. In addition, PPE has such a problem that the moldability thereof is bad because of its low flowability. The ABS resin is also unsuitable as a resin for a connector used under severe conditions in viewpoints of heat resistance, chemical resistance and rigidity, and additionally, it has such a problem that the moldability thereof is bad because of its low flowability.

Of the above-mentioned thermoplastic resins, the polyamide resin is relatively well balanced between the characteristics. Generally used as the polyamide resin is an aliphatic polyamide, but this aliphatic polyamide has a high water absorption rate. Therefore, a connector formed from this aliphatic polyamide varies in its dimension, electrical resistance value, etc. when the connector absorbs water. Especially when the connector is warped, the connector is unable to be connected with the device.

By the way, an aromatic polyamide is known as a polyamide other than the aliphatic polyamide. The aromatic polyamide is obtained from an aromatic dicarboxylic acid as a dicarboxylic acid component and diamine and subjecting this aromatic dicarboxylic acid and diamine to polycondensation reaction.

The aromatic polyamide has a low water absorption rate differently from the aliphatic polyamide, and hence the above-mentioned problems such as decrease of dimensional accuracy and change of electrical resistance value occurring associated with the water absorption of the connector can be solved by using the aromatic polyamide.

However, as a result of further studies on the connector formed from the aromatic polyamide in more detail, the followings have been found. That is, when the connector is exposed to a high temperature, the aromatic polyamide is sometimes thermally deteriorated, and this thermal deterioration of the aromatic polyamide causes lowering of toughness of the connector. The connector thus lowered in toughness becomes poor in stretchability, and thereby the connector is hardly connected smoothly with the device.

Particularly in these years, electrical parts such as connectors are often incorporated into a device by soldering them through an infrared reflow method. If the connector is lowered in toughness by the heat of the infrared reflowing, reduction of workability in the assembly operation of the device or lowering of durability of the device is induced. Further, especially when the connector is used under such conditions that heating and cooling are repeatedly carried out, for example, under conditions within an automotive engine room, the toughness of the connector is easily reduced.

Japanese Patent Laid-Open Publication No. 60(1985)-44362 by the present applicant describes a composition of an aromatic polyamide having improved toughness. Concretely, the composition described in this publication contains the aromatic polyamide and a modified α-olefin elastic polymer.

In the above publication, studies on heat resistance required for engineering plastic products formed from the polyamide composition by a conventional melt molding method are disclosed, but there is not taken into account any property required for the case where a product made of the polyamide composition is exposed to an extremely high temperature as in the case of a connector of automobile. Accordingly, in order to improve reliability of connectors, resin molded products should be further improved in the long-term heat resistance.

For improving heat resistance of polyamide, there is known a method of adding various stabilizers to the polyamide, as well as the method of adding other resins to the polyamide. For example, Japanese Patent Laid-Open Publications No. 2(1990)-212533, No. 2(1990)-214752, No. 2(1990)-173059 and No. 62(1987)-273256 disclose a polyamide resin composition comprising a specific phenol type stabilizer, a specific sulfur type stabilizer and a specific phosphorus type stabilizer and an aliphatic polyamide such as polyamide 66 or polyamide(ε-caprolactam)/66. The aliphatic polyamide is used as the polyamide and the melting point of the aliphatic polyamide is much lower than that of the aromatic polyamide. Therefore, molded products formed from the compositions comprising the aliphatic polyamide and the stabilizers as described in the above publications exhibit excellent properties. However, if the aromatic polyamide is used instead of the aliphatic polyamide in the composition, foaming of the stabilizers is brought about during the preparation of a composition or the molding procedure of the composition, since the melting point of the aromatic polyamide is high.

Japanese Patent Laid-Open Publication No. 57(1982)-123254 discloses a composition comprising a polyamide, a specific phenol type stabilizer, a specific sulfur type stabilizer and a copper compound. In this composition, the copper compound is used as an essential component to exhibit sufficient thermal aging resistance, and hence the composition can be enhanced in heat stability when the copper compound is used in combination with the specific phenol type stabilizer and the specific sulfur type stabilizer. However, the composition sometimes suffers evil effects of metal caused by the copper compound which is added as the stabilizer. Especially when the composition is contaminated with metallic copper liberated from the copper compound, electrical properties of the resin sometimes vary, and the resin having such variability of electrical properties should not be used as a connector. Further, this resin composition also has such a problem that foaming is brought about during the preparation of the composition or the molding procedure thereof, similarly to the above-mentioned case. In other words, formulation of stabilizers having been conventionally applied to the aliphatic polyamide is not always satisfactory for the aromatic polyamide.

OBJECT OF THE INVENTION

It is an object of the present invention to provide a thermoplastic resin composition suitable for a lightweight molded product having high impact strength and heat resistance, particularly suitable for a connector.

It is another object of the present invention to provide a connector having housing formed from the above-mentioned resin composition, said connector being excellent in heat resistance.

It is a further object of the present invention to provide a thermoplastic resin composition capable of forming a molded product excellent in heat resistance, toughness, low water absorption properties and thermal aging resistance, said resin composition being free from foaming during the preparation of the composition and the processing procedure such as a molding procedure of the composition, having no evil effects of metal, and being free from gas burning during the molding procedure.

It is a still further object of the present invention to provide a connector having housing formed from the above-mentioned resin composition, said connector being excellent in heat resistance.

SUMMARY OF THE INVENTION

The polyamide resin composition of the present invention is a polyamide resin composition containing resin components and antioxidants, said resin components comprising:

(A) aromatic polyamide in an amount of 50 to 85% by weight, which comprises repeating units formed from dicarboxylic acid constituent units and diamine constituent units, said dicarboxylic acid constituent units comprising 40-100% by mol of terephthalic acid constituent units, 0-50% by mol of aromatic dicarboxylic acid constituent units other than terephthalic acid constituent units and/or 0-60% by mol of aliphatic dicarboxylic acid constituent units having 4 to 20 carbon atoms, said diamine constituent units comprising aliphatic diamine constituent units and/or alicyclic diamine constituent units, said aromatic polyamide having an intrinsic viscosity, as measured in a concentrated sulfuric acid at 30° C., of 0.5 to 3.0 dl/g and a melting point of higher than 290° C.;

(B) at least one modified polymer selected from the group consisting of a graft-modified α-olefin polymer, a graft-modified product of a cycloolefin copolymer which is an addition polymer of cycloolefin and ethylene, a graft-modified aromatic vinyl type hydrocarbon/conjugated diene copolymer, a hydrogenation product of this copolymer and an ethylene copolymer containing a carboxyl group and a carboxylic metal salt in the side chain, in an amount of 10 to 40% by weight; and (C) aliphatic polyamide in an amount of 1 to 15% by weight;

said antioxidants comprising:

(D) a hindered phenol type antioxidant having a molecular weight of not less than 500 and a 10% weight loss temperature of not lower than 300° C. in a thermogram measured in air; and (E) a sulfur type antioxidant having a molecular weight of not less than 600 and a 10% weight loss temperature of not lower than 280° C. in a thermogram measured in air;

wherein, the total amount of the hindered phenol type antioxidant (D) and the sulfur type antioxidant (E) is in the range of 0.2 to 4 parts by weight based on 100 parts weight of the resin components, and a weight ratio between the hindered phenol type antioxidant (D) and the sulfur type antioxidant (E) is in the range of 1:5 to 5:1.

The connector of the present invention is a connector having housing made of a polyamide resin composition containing resin components and antioxidants, said resin components comprising:

(A) aromatic polyamide in an amount of 50 to 85% by weight, which comprises repeating units formed from dicarboxylic acid constituent units and diamine constituent units, said dicarboxylic acid constituent units comprising 40-100% by mol of terephthalic acid constituent units, 0-50% by mol of aromatic dicarboxylic acid constituent units other than terephthalic acid constituent units and/or 0-60% by mol of aliphatic dicarboxylic acid constituent units having 4 to 20 carbon atoms, said diamine constituent units comprising aliphatic diamine constituent units and/or alicyclic diamine constituent units, said aromatic polyamide having an intrinsic viscosity, as measured in a concentrated sulfuric acid at 30° C., of 0.5 to 3.0 dl/g and a melting point of higher than 290° C.;

(B) at least one modified polymer selected from the group consisting of a graft-modified α-olefin polymer, a graft-modified product of a cycloolefin copolymer which is an addition polymer of cycloolefin and ethylene, a graft-modified aromatic vinyl type hydrocarbon/conjugated diene copolymer, a hydrogenation product of this copolymer and an ethylene copolymer containing a carboxyl group and a carboxylic metal salt in the side chain, in an amount of 10 to 40% by weight; and (C) aliphatic polyamide in an amount of 1 to 15% by weight;

said antioxidants comprising:

(D) a hindered phenol type antioxidant having a molecular weight of not less than 500 and a 10% weight loss temperature of not lower than 300° C. in a thermogram measured in air; and (E) a sulfur type antioxidant having a molecular weight of not less than 600 and a 10% weight loss temperature of not lower than 280° C. in a thermogram measured in air;

wherein, the total amount of the hindered phenol type antioxidant (D) and the sulfur type antioxidant (E) is in the range of 0.2 to 4 parts by weight based on 100 parts weight of the resin components, and a weight ratio between the hindered phenol type antioxidant (D) and the sulfur type antioxidant (E) is in the range of 1:5 to 5:1.

As described above, the polyamide resin composition of the invention comprises at least three kinds of resin components, a specific hindered phenol type antioxidant and a specific sulfur type antioxidant, and hence the resin composition has extremely high heat stability. Particularly, since no foaming takes place in the process for preparing the resin composition of the invention and the process for preparing a molded product from the resin composition, a molded product almost free from defects and having high accuracy can be prepared from the composition. Further, the resin composition of the invention contains no metal compound, so that any evil effect of metal is not brought about.

The connector of the present invention has housing made of at least three kinds of resin components, a specific hindered phenol type antioxidant and a specific sulfur type antioxidant as described above, and hence the connector has a low specific gravity and is lightweight. Moreover, the connector of the invention shows extremely high heat resistance and is hardly reduced in toughness even when exposed to a high temperature for a long period of time.

DETAILED DESCRIPTION OF THE INVENTION

Figure 1:
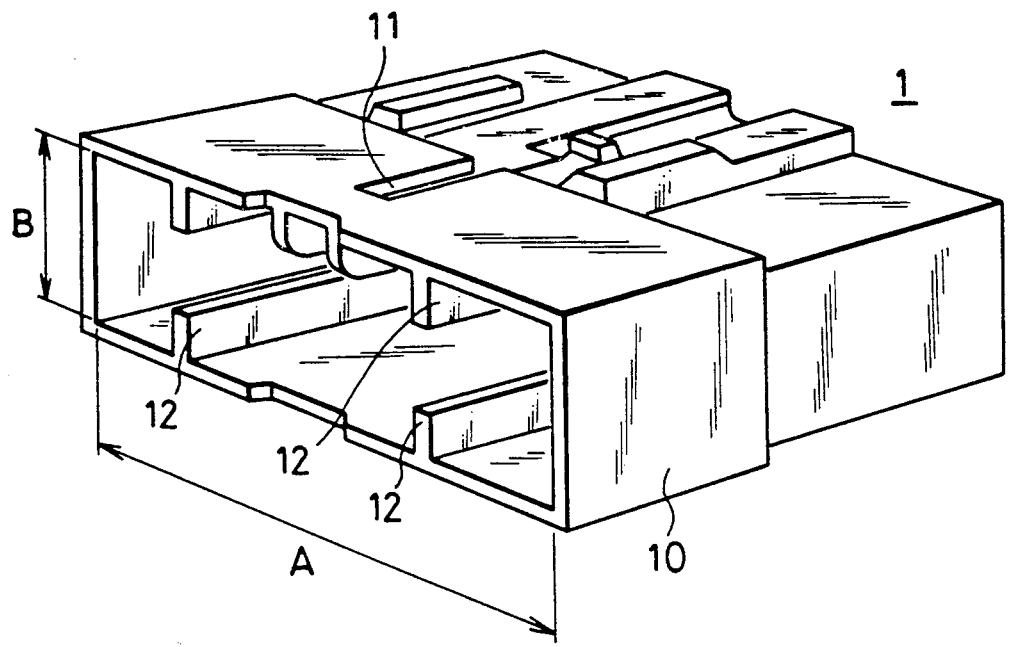
FIG. 1 is a perspective view showing one example of female housing of a connector according to the present invention.

The polyamide resin composition and the connector according to the present invention are described in detail hereinafter.

First, the polyamide resin composition of the invention is described below.

The polyamide resin composition of the invention comprises at least three kinds of resin components, namely, a specific aromatic polyamide (A), a specific graft-modified polymer (B) and an aliphatic polyamide (C), and a specific hindered phenol type antioxidant (D) and a specific sulfur type antioxidant (E), all described below.

The aromatic polyamide (A) for the polyamide resin composition of the invention comprises a specific dicarboxylic acid constituent unit [a] and a specific aliphatic diamine constituent unit or a specific alicyclic diamine constituent unit [b].

The specific dicarboxylic acid constituent unit [a] for the polyamide has a terephthalic acid constituent unit (a-1) as an essential constituent unit. The repeating unit having the terephthalic acid constituent unit (a-1) can be represented by the following formula [I-a].

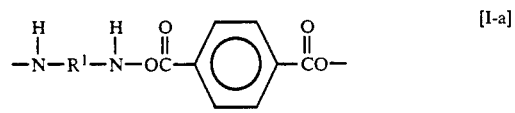

wherein $R^1$ is a divalent aliphatic or alicyclic hydrocarbon group, preferably an alkylene group of 4 to 18 carbon atoms.

All of the dicarboxylic acid constituent units [a] are not necessarily constituent units represented by the above formula [I-a], and a part of the above-mentioned terephthalic acid constituent units (a-1) may be other dicarboxylic acid constituent units.

The dicarboxylic acid constituent units other than terephthalic acid constituent units include (a-2) aromatic dicarboxylic acid constituent units other than terephthalic acid constituent units and (a-3) aliphatic dicarboxylic acid constituent units.

Examples of the aromatic dicarboxylic acid constituent units other than terephthalic acid constituent units (a-2) include an isophthalic acid constituent unit, a 2-methylterephthalic acid constituent unit and a naphthalene dicarboxylic acid constituent unit. When the aromatic polyamide for forming the composition of the invention contains constituent unit derived from other aromatic dicarboxylic acids than the terephthalic acid, the isophthalic terephthalic acid constituent unit is particularly preferably used as this constituent unit (a-2).

Among from the aromatic dicarboxylic acid constituent units other than terephthalic acid constituent units (a-2), the repeating unit having this preferred isophthalic acid constituent unit can be represented by the following formula [I-b].

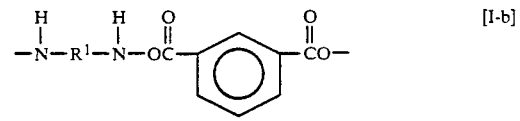

wherein $R^1$ is a divalent aliphatic or alicyclic hydrocarbon group, preferably an alkylene group of 4 to 18 carbon atoms.

The aliphatic dicarboxylic acid constituent unit (a-3) is derived from an aliphatic dicarboxylic acid having an alkylene group of generally 4 to 20 carbon atoms, preferably 6 to 12 carbon atoms. Examples of the aliphatic dicarboxylic acids employable for deriving the aliphatic dicarboxylic acid constituent unit (a-3) include succinic acid, adipic acid, azelaic acid and sebacic acid.

When the polyamide has the aliphatic dicarboxylic acid constituent unit, particularly preferred as this constituent unit are an adipic acid constituent unit and a sebacic acid constituent unit.

The repeating unit having the aliphatic dicarboxylic acid constituent unit (a-3) for the dicarboxylic acid constituent unit [a] can be represented by the following formula [II].

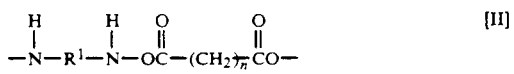

wherein $R^1$ has the same meaning as defined above, and n is an integer of generally 2 to 18, preferably 4 to 10.

The diamine constituent units [b] for forming the aromatic polyamide together with the above-mentioned dicarboxylic acid constituent units [a] can be derived from aliphatic alkylenediamine of 4 to 18 carbon atoms and alicyclic diamine.

Concrete examples of the aliphatic alkylenediamine include 1,4-diaminobutane, 1,6-diaminohexane, trimethyl-1,6-diaminohexane, 1,7-diaminoheptane, 1,8-diaminooctane, 1,9-diaminononane, 1,10-diaminodecane, 1,11-diaminoundecane and 1,12-diaminododecane. A concrete example of the alicyclic diamine is diaminocyclohexane.

Particularly preferred as the diamine constituent units in the invention are those derived from straight-chain aliphatic alkylenediamine. As the straight-chain aliphatic alkylenediamine, 1,6-diaminohexane, 1,8-diaminooctane, 1,10-diaminodecane and 1,12-diaminododecane are preferred. Also preferred are mixtures of those alkylenediamines. Of these, 1,6-diaminohexane is particularly preferred.

A content of the terephthalic acid constituent units (a-1) in all of the dicarboxylic acid constituents (100% by mol) for the aromatic polyamide (A) used in the invention is in the range of 40 to 100% by mol, preferably 45 to 100% by mol, more preferably 50 to 100% by mol, most preferably 50 to 80% by mol, and the total content of the aromatic dicarboxylic acid constituent units other than terephthalic acid constituent units (a-2) and/or the aliphatic dicarboxylic acid constituent units (a-3) is in the range of 0 to 65% by mol, preferably 0 to 60% by mol, more preferably 0 to 50% by mol, most preferably 0 to 30% by mol. A content of the aliphatic dicarboxylic acid constituent units (a-3) is generally in the range of 0 to 50% by mol, preferably 1 to 45% by mol.

The aromatic polyamide (A) may contain constituent units derived from tribasic or more basic polyvalent carboxylic acid such as trimellitic acid or pyromellitic acid in a small amount, in addition to the above-mentioned aromatic dicarboxylic acid constituent units, namely, the terephthalic acid constituent units which are host constituent units, the constituent units derived from divalent aromatic dicarboxylic acids other than the terephthalic acid (typically isophthalic acid constituent units) and the aliphatic dicarboxylic acid constituent units. The constituent units derived from the polyvalent carboxylic acid are contained in the aromatic polyamide (A) for the composition of the invention in an amount of 0 to 5% by mol.

The aromatic polyamide (A) used for the composition of the invention may be a mixture of aromatic polyamide mainly comprising the repeating units represented by the aforementioned formula [I-a] and aromatic polyamide mainly comprising the repeating units represented by the aforementioned formula [I-b]. In this case, a content of the aromatic polyamide mainly comprising the repeating units represented by the formula [I-a] is usually not less than 50% by weight, preferably not less than 60% by weight.

The aromatic polyamide (A) has an intrinsic viscosity $[\eta]$, as measured in a concentrated sulfuric acid at 30° C., of usually 0.5 to 3.0 dl/g, preferably 0.5 to 2.8 dl/g, more preferably 0.6 to 2.5 dl/g. This aromatic polyamide (A) shows a melting point higher than that of aliphatic polyamide conventionally used. In detail, the aromatic polyamide (A) used in the invention has a melting point of higher than 290° C. A composition comprising the aromatic polyamide having a melting point of preferably not lower than 300° C., more preferably in the range of 305° to 340° C., particularly preferably in the range of 310° to 340° C., is prominently excellent in the heat resistance. Further, the aromatic polyamide generally has a glass transition temperature of not lower than 80° C. at its non-crystalline portion. A resin composition comprising the aromatic polyamide having a melting point and a glass transition temperature at the non-crystalline portion in the above ranges hardly becomes molten even when a molded product formed from the composition is exposed to a high temperature. Moreover, since the above-mentioned aromatic polyamide is excellent in moldability, a molded product can be easily prepared by using this aromatic polyamide. Furthermore, since this aromatic polyamide has a glass transition temperature of not lower than 80° C. at the non-crystalline portion as described above, a dimensional change of a molded product formed from the aromatic polyamide hardly takes place even when the molded product is exposed to a high temperature.

The aromatic polyamide shows a low value with respect to the water absorption, the water absorption properties being a problem for the conventional aliphatic polyamide.

It is necessary that the aromatic polyamide (A) is contained in the resin components of the polyamide resin composition of the invention in an amount of 50 to 85% by weight. Especially when the amount of the aromatic polyamide (A) is 66 to 84% by weight, preferably 67 to 83% by weight, more preferably 69 to 81 by weight, particularly preferably 70 to 80% by weight, there can be obtained a composition capable of forming a molded product which has well balanced various properties such as heat resistance, low water absorption properties and toughness.

The polyamide resin composition of the invention comprises at least one modified polymer (B) selected from the group consisting of a graft-modified α-olefin polymer (B-1), a graft-modified product of a cycloolefin copolymer obtained by addition polymerization of cycloolefin with ethylene (B-2), a graft-modified aromatic vinyl type hydrocarbon/conjugated diene copolymer or a hydrogenation product of this copolymer (B-3) and an ethylene copolymer containing a carboxyl group and a carboxylic metal salt in the side chain (B-4).

The graft-modified α-olefin polymer (B-1) used as the modified polymer (B) in the invention is a graft-modified α-olefin random elastic copolymer having low-crystalline to non-crystalline properties.

The graft-modified α-olefin random elastic copolymer (B-1) is a graft-modified product of a copolymer in which two kinds of repeating units derived from different α-olefins are arranged at random.

This graft-modified α-olefin random elastic copolymer is a low-crystalline to non-crystalline copolymer, preferably, substantially non-crystalline. In other words, a crystallinity of the copolymer, as measured by means of X-ray diffractometry, is not more than 10%, preferably not more than 5%, particularly preferably 0%. Accordingly, most of the graft-modified α-olefin random elastic copolymers show no definite melting point. Further, the graft-modified α-olefin random elastic copolymer is a soft polymer because of its low crystallinity, and this elastic copolymer has a tensile modulus of generally not less than 0.1 kg/cm$^2$ but less than 20,000 kg/cm$^2$, preferably in the range of 1 to 15,000 kg/cm$^2$.

A melt index of the graft-modified α-olefin random elastic copolymer (measured at 190° C.) is usually in the range of 0.1 to 30 g/10 min, preferably 1.0 to 20 g/10 min, particularly preferably 2.0 to 15 g/10 min, and a Mw/Mn value thereof measured by GPC is usually not more than 5.5, preferably not more than 4.5, particularly preferably not more than 3.5.

Further, the graft-modified α-olefin random elastic copolymer has a glass transition temperature (Tg) of usually −150° to +50° C., preferably −80° to −20° C., an intrinsic viscosity [η] as measured in decalin at 135° C. of usually 0.2 to 10 dl/g, preferably 1 to 5 dl/g, and a density of usually 0.82 to 0.96 g/cm$^3$, preferably 0.84 to 0.92 g/cm$^3$.

Concrete examples of the graft-modified α-olefin random elastic copolymer (B-1) having the above-mentioned properties include:

(i) a graft-modified ethylene/α-olefin copolymer rubber prepared mainly from ethylene, and (ii) a graft-modified propylene/α-olefin copolymer rubber prepared mainly from propylene.

The graft-modified α-olefin random elastic copolymer is described in more detail with reference to its typical examples, namely, the graft-modified ethylene/α-olefin copolymer rubber (i) and the graft-modified propylene/α-olefin copolymer rubber (ii).

As the α-olefin for forming the graft-modified ethylene/α-olefin copolymer rubber (i), α-olefin of 3 to 20 carbon atoms is generally employed. Examples of such α-olefin include propylene, 1-butene, 1-pentene, 1-hexene, 4-methyl-1-pentene, 1-octene, 1-decene and mixtures thereof. Of these, propylene and/or 1-butene is particularly preferred.

As the α-olefin for forming the graft-modified propylene/α-olefin copolymer rubber (ii), α-olefin of 4 to 20 carbon atoms is generally employed. Examples of such α-olefin include 1-butene, 1-pentene, 1-hexene, 4-methyl-1-pentene, 1-octene, 1-decene and mixtures thereof. Of these, 1-butene is particularly preferred.

In the graft-modified ethylene/α-olefin copolymer rubber (i), a molar ratio of ethylene to α-olefin (ethylene/α-olefin) varies depending on the kind of α-olefin, but is usually in the range of 10/90 to 99/1, preferably 50/50 to 95/5. When the α-olefin is propylene, the molar ratio is preferably in the range of 50/50 to 90/10, and when the α-olefin is α-olefin of 4 or more carbon atoms, the molar ratio is preferably in the range of 80/20 to 95/5.

This α-olefin random copolymer may contain other constituent units than those derived from α-olefin, such as constituent units derived from diene compounds, with the proviso that the properties of the α-olefin random elastic copolymer are not marred.

Examples of the constituent units permitted to be contained in the α-olefin random elastic copolymer include:

constituent units derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene;

constituent units derived from diene compounds such as 2,3-diisopropylidene-5-norbornene, 2-ethylidene-3-isopropylidene-5-norbornene and 2-propenyl-2,2-norbornadiene; and constituent units derived from cycloolefins.

These diene constituent units are contained in the α-olefin random elastic copolymer in an amount of generally not more than 10% by mol, preferably not more than 5% by mol.

Examples of ethylene/α-olefin copolymer forming the graft-modified ethylene/α-olefin copolymer rubber (i) include:

copolymers such as ethylene/propylene copolymer, ethylene/1-butene copolymer, ethylene/4-methyl-1-pentene copolymer, ethylene/1-hexene copolymer, ethylene/1-octene copolymer and ethylene/1-decene copolymer; and copolymers such as ethylene/propylene/1,4-hexadiene copolymer, ethylene/propylene/dicyclopentadiene copolymer, ethylene/propylene/5-ethylidene-2-norbornene copolymer, ethylene/propylene/2,5-norbornadiene copolymer, ethylene/1-butene/dicyclopentadiene copolymer, ethylene/1-butene/1,4-hexadiene copolymer and ethylene/1-butene/5-ethylidene-2-norbornene copolymer.

In the graft-modified propylene/α-olefin copolymer rubber (ii), a molar ratio of propylene to α-olefin (propylene/α-olefin) varies depending on the kind of α-olefin, but is preferably in the range of 50/50 to 95/5. When the α-olefin is 1-butene, the molar ratio is preferably in the range of 50/50 to 90/10, and when the α-olefin is α-olefin of 5 or more carbon atoms, the molar ratio is preferably in the range of 80/20 to 95/5.

Examples of propylene/α-olefin copolymer for the graft-modified propylene/α-olefin copolymer rubber (ii) include:

copolymers such as propylene/1-butene copolymer, propylene/4-methyl-1-pentene copolymer, propylene/1-hexene copolymer, propylene/1-octene copolymer, propylene/1-decene copolymer, propylene/dicyclopentadiene copolymer, propylene/5-ethylidene-2-norbornene copolymer and propylene/2,5-norbornadiene copolymer; and copolymers such as propylene/1-butene/dicyclopentadiene copolymer, propylene/1-butene/1,4-hexadiene copolymer and propylene/1-butene/5-ethylidene-2-norbornene copolymer.

The graft-modified α-olefin random elastic copolymer (B-1) for the composition of the invention is prepared by graft-modifying the unmodified α-olefin random elastic copolymer mentioned as above using unsaturated carboxylic acids, unsaturated carboxylic anhydrides or unsaturated carboxylic acid derivatives.

Examples of the unsaturated carboxylic acids used herein include acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo[2.2.1]hepto-5-ene-2,5-dicarboxylic acid (nadic acid TM) and methylendocis-bicyclo[2.2.1]hepto-5-ene-2,5-dicarboxylic acid (methylnadic acid TM). Examples of the unsaturated carboxylic anhydrides preferably used include maleic anhydride, citraconic anhydride, nadic anhydride and methylnadic anhydride. Examples of the unsaturated carboxylic acid derivatives include acid halide compounds of the above-mentioned unsaturated carboxylic acids (e.g., maleyl chloride), imide compounds thereof (e.g., maleimide) and ester compounds thereof (e.g., monomethyl maleate, dimethyl maleate and glycidyl maleate).

The above-mentioned graft modifiers may be used singly or in combination.

Of the graft modifiers, the unsaturated carboxylic anhydrides are preferably used, and among these, maleic anhydride or nadic anhydride is particularly preferred.

For graft-modifying the unmodified α-olefin random elastic copolymer with the graft modifier, there are known a method of suspending or dissolving the unmodified α-olefin random elastic copolymer in a solvent and adding the graft modifier to the resulting suspension or solution to perform graft reaction (solution method) and a method of melting a mixture of the unmodified α-olefin random elastic copolymer and the graft modifier to perform graft reaction (melting method).

In the graft reaction of the above methods, the amount of the graft modifier is determined in consideration of reactivity of the graft modifier, but the amount thereof is generally in the range of 1 to 10 parts by weight based on 100 parts by weight of the unmodified α-olefin random elastic copolymer.

Through the above-mentioned graft reaction, there can be obtained a graft-modified α-olefin random elastic copolymer in which the graft modifier is graft polymerized in an amount of 0.01 to 10 parts by weight, preferably 0.05 to 5 parts by weight, per 100 parts by weight of the unreacted α-olefin random elastic copolymer.

In the graft reaction, a radical initiator is preferably used to enhance the graft efficiency. Examples of the radical initiator used herein are conventionally known radical initiators such as organic peroxides, organic peresters and azo compounds. In the case of using the radical initiator, the amount thereof is generally in the range of 0.01 to 20 parts by weight per 100 parts by weight of the unmodified α-olefin random elastic copolymer.

By the use of a graft-modified ethylene/propylene random copolymer rubber or a graft-modified ethylene/α-olefin random copolymer, each having an ethylene content of 35 to 50% by mol and being substantially non-crystalline, among from the above-described graft-modified α-olefin random elastic copolymers (B-1), a molded product having high toughness can be obtained.

The graft-modified product of cycloolefin copolymer (B-2) used as the modified polymer (B) in the invention can be prepared by modifying a cycloolefin copolymer with a monomer for graft modification, said cycloolefin copolymer being obtained by addition polymerization of cycloolefin and ethylene.

The cycloolefin used herein is a compound having a cyclic structure and containing at least one reactive double bond within the cyclic structure. One preferred example of the cycloolefin is represented by the following formula [III].

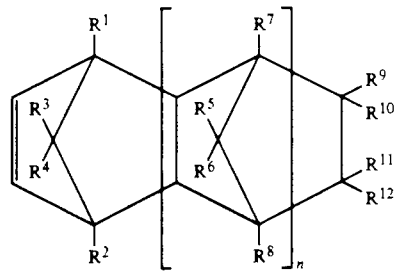

[III]

wherein n is 0 or a positive integer, $R^1$ to $R^{12}$ are each independently a hydrogen atom, a halogen atom or a hydrocarbon group.

Examples of the halogen atom include fluorine atom, chlorine atom, bromine atom and iodine atom. Examples of the hydrocarbon group include alkyl group generally having 1 to 20 carbon atoms and cycloalkyl group generally having 3 to 15 carbon atoms. Concrete examples of the alkyl group include methyl group, ethyl group, propyl group, isoproyl group, amyl group, hexyl group, octyl group, decyl group, dodecyl group and octadecyl group. A concrete example of the cycloalkyl group is cyclohexyl group.

Concrete examples of such cycloolefins as mentioned above are given below.

The bicyclo[2.2.1]hept-2-ene derivatives such as

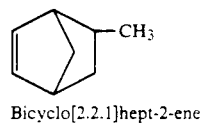

Bicyclo[2.2.1]hept-2-ene

6-Methylbicyclo[2.2.1]hept-2-ene

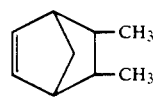

5,6-Dimethylbicyclo[2.2.1]-hept-2-ene

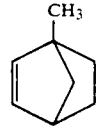

1-Methylbicyclo[2.2.1]hept-2-ene

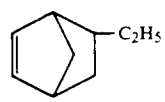

6-Ethylbicyclo[2.2.1]hept-2-ene

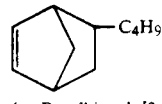

6-n-Butylbicyclo[2.2.1]hept-2-ene

-continued

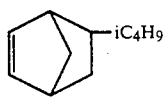
6-Isobutylbicyclo[2.2.1]hept-2-ene

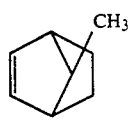
7-Methylbicyclo[2.2.1]hept-2-ene the tetracyclo[4.4.0.1$^{2,5}$.1$^{7,10}$]-3-dodecene derivatives such as

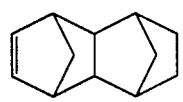
Tetracyclo[4.4.0.1$^{2,5}$.1$^{7,10}$]-3-dodecene

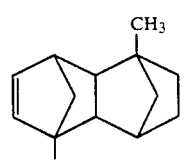
5,10-Dimethyltetracyclo-[4.4.0.1$^{2,5}$.1$^{7,10}$]-3-dodecene

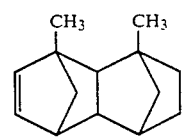
2,10-Dimethyltetracyclo-[4.4.0.1$^{2,5}$.1$^{7,10}$]-3-dodecene

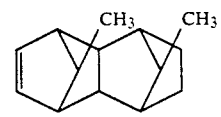
11,12-Dimethyltetracyclo-[4.4.0.1$^{2,5}$.1$^{7,10}$]-3-dodecene

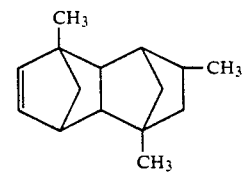
2,7,9-Trimethyltetracyclo-[4.4.0.1$^{2,5}$.1$^{7,10}$]-3-dodecene

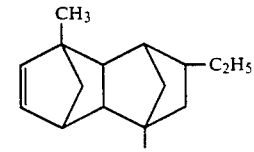
9-Ethyl-2,7-dimethyltetracyclo-[4.4.0.1$^{2,5}$.1$^{7,10}$]-3-dodecene

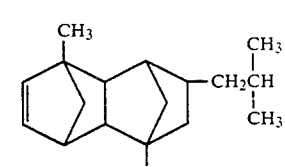
9-Isobutyl-2,7-dimethyltetracyclo-[4.4.0.1$^{2,5}$.1$^{7,10}$]-3-dodecene -continued

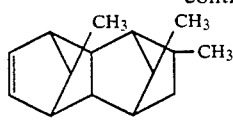
9,11,12-Trimethyltetracyclo-[4.4.0.1$^{2,5}$.1$^{7,10}$]-3-dodecene

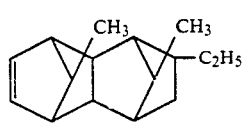
9-Ethyl-11,12-dimethyltetracyclo-[4.4.0.1$^{2,5}$.1$^{7,10}$]-3-dodecene

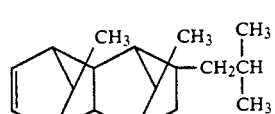
9-Isobutyl-11,12-dimethyltetracyclo-[4.4.0.1$^{2,5}$.1$^{7,10}$]-3-dodecene

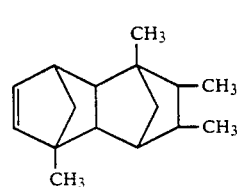
5,8,9,10-Tetramethyltetracyclo-[4.4.0.1$^{2,5}$.1$^{7,10}$]-3-dodecene

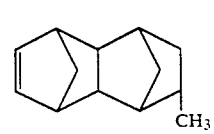
8-Methyltetracyclo-[4.4.0.1$^{2,5}$.1$^{7,10}$]-3-dodecene

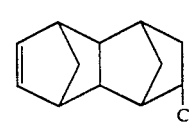
8-Ethyltetracyclo [4.4.0.1$^{2,5}$.1$^{7,10}$]-3-dodecene

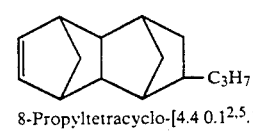
8-Propyltetracyclo-[4.4 0.1$^{2,5}$.1$^{7,10}$]-3-dodecene

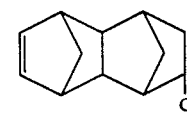
8-Hexyltetracyclo [4.4.0.1$^{2,5}$.1$^{7,10}$]-3-dodecene

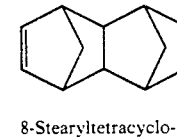
8-Stearyltetracyclo-[4.4.0.1$^{2,5}$.1$^{7,10}$]-3-dodecene

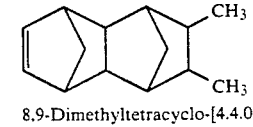
8,9-Dimethyltetracyclo-[4.4.0.1$^{2,5}$.1$^{7,10}$]-3-dodecene

-continued

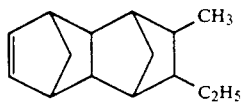
8,-Methyl-9-ethyltetracyclo-[4.4.0.1$^{2,5}$.1$^{7,10}$]-3-dodecene

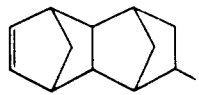
8-Chlorotetracyclo-[4.4.0.1$^{2,5}$.1$^{7,10}$]-3-dodecene

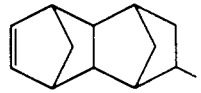
8-Bromotetracyclo-[4.4.0.1$^{2,5}$.1$^{7,10}$]-3-dodecene

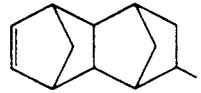
8-Fluorotetracyclo-[4.4.0.1$^{2,5}$.1$^{7,10}$]-3-dodecene

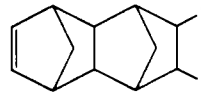
8,9-Dichlorotetracyclo-[4.4.0.1$^{2,5}$.1$^{7,10}$]-3-dodecene

8-Cyclohexyltetracyclo-[4.4.0.1$^{2,5}$.1$^{7,10}$]-3-dodecene

8-Isobutyltetracyclo-[4.4.0.1$^{2,5}$.1$^{7,10}$]-3-dodecene

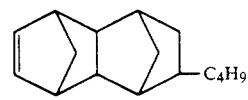
8-Butyltetracyclo-[4.4.0.1$^{2,5}$.1$^{7,10}$]-3-dodecene the hexacyclo[6.6.1.1$^{3,6}$.1$^{10,13}$.0$^{2,7}$.0$^{9,14}$]-4-heptadecene derivatives such as

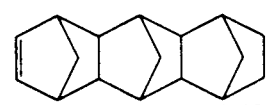
Hexacyclo [6.6.1.1$^{3,6}$.1$^{10,13}$.0$^{2,7}$.0$^{9,14}$]-heptadecene

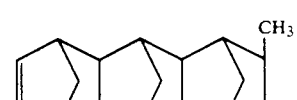
12-Methylhexacyclo [6.6.1.1$^{3,6}$.1$^{10,13}$.0$^{2,7}$.0$^{9,14}$]-4-heptadecene

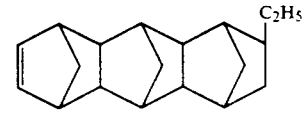
12-Ethylhexacyclo [6.6.1.1$^{3,6}$.1$^{10,13}$.0$^{2,7}$.0$^{9,14}$]-4-heptadecene

12-Isobutylhexacyclo [6.6.1.1$^{3,6}$.1$^{10,13}$.0$^{2,7}$.0$^{9,14}$]-4-heptadecene

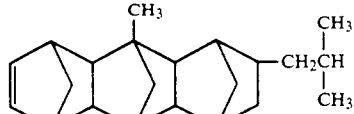
1,6,10-Trimethyl-12-isobutylhexacyclo [6.6.1.1$^{3,6}$.1$^{10,13}$.0$^{2,7}$.0$^{9,14}$]-4-heptadecene the octacyclo[8.8.0.1$^{2,9}$.1$^{4,7}$.1$^{11,18}$.1$^{13,16}$.0$^{3,8}$.0$^{12,17}$]-5-docosene derivatives such as

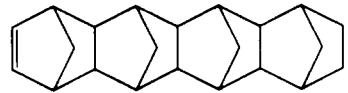
Octacyclo [8.8.0.1$^{2,9}$.1$^{4,7}$.1$^{11,18}$, 1$^{13,16}$.0$^{3,8}$.0$^{12,17}$]-5-docosene

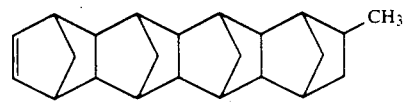
15-Methyloctacyclo [8.8.0.1$^{2,9}$.1$^{4,7}$.1$^{11,18}$, 1$^{13,16}$.0$^{3,8}$.0$^{12,17}$]-5-docosene

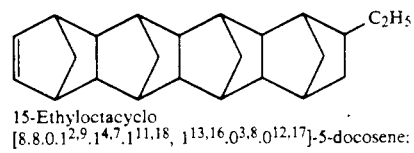
15-Ethyloctacyclo [8.8.0.1$^{2,9}$.1$^{4,7}$.1$^{11,18}$, 1$^{13,16}$.0$^{3,8}$.0$^{12,17}$]-5-docosene:

The cycloolefins represented by the above formula [III] can be easily prepared by condensing cyclopentadienes with olefins or cycloolefins corresponding to the cyclopentadienes through Diels-Alder reaction.

The cycloolefins may be used singly or in combination.

The cycloolefin copolymer used for the modified product (B) in the invention is an addition polymer of the cycloolefin represented by the formula [III] and ethylene.

However, the cycloolefin copolymer used in the invention may be a copolymer of the cycloolefin, ethylene and other olefin compound.

Examples of the olefin compound copolymerizable with ethylene and the cycloolefin represented by the formula [III] include:

α-olefins of 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene;

cycloolefins such as cyclopentene, cyclohexene, 3-methylcyclohexene, cyclooctene and 3a,5,6,7a-tetrahydro-4,7-methano-1H-indene;

non-conjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene;

norbornenes such as 2-norbornene, 5-methyl-2-norbornene, 5-ethyl-2-norbornene, 5-isopropyl-2-norbornene, 5-n-butyl-2-norbornene, 5-i-butyl-2-norbornene, 5,6-dimethyl-2-norbornene, 5-chloro-2-norbornene, 2-fluoro-2-norbornene and 5,6-dichloro-2-norbornene.

Of these, preferred are α-olefins of 3 to 15 carbon atoms, particularly α-olefins of 3 to 10 carbon atoms.

The above-mentioned α-olefins may be used singly or in combination.

In the case of using a compound having two or more double bonds in its molecule as cycloolefin other than the cycloolefin represented by the formula [III], this compound may be hydrogenated to improve weathering resistance.

The reaction of ethylene with the cycloolefin represented by the formula [III] is generally carried out using a catalyst comprising a vanadium compound which is soluble in a reaction solvent and an organoaluminum compound.

In the cycloolefin random copolymer, the cycloolefin represented by the formula [III] is thought to have a structure represented by the following formula [III-a].

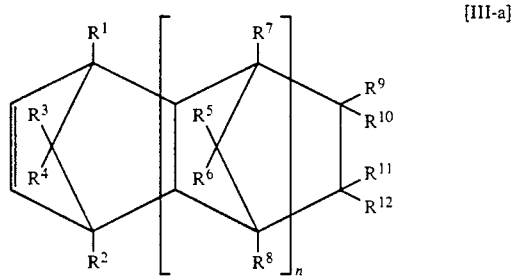

wherein p, q, m, n, and $R^1$ to $R^{19}$ have the same meanings as defined in the aforementioned formula [III].

The cycloolefin type resin prepared as above may be purified if necessary by subjecting it to a deashing procedure, a filtering procedure, a precipitation procedure, etc. The deashing procedure is carried out, for example, by bringing the reaction solution into contact with an aqueous solution of alkali to remove a residual catalyst remaining in the resin. The precipitation procedure is carried out, for example, by introducing the reaction solution in a poor solvent to precipitate the resin dissolved in the reaction solvent.

The cycloolefin copolymer has an iodine value of usually not more than 5, preferably not more than 1, and has an intrinsic viscosity [η], as measured in decalin at 135° C., of usually 0.01 to 20 dl/g, preferably 0.05 to 10 dl/g, more preferably 0.08 to 8 dl/g.

The cycloolefin copolymer generally is non-crystalline or low-crystalline, preferably non-crystalline, and accordingly this cycloolefin copolymer has high transparency. Further, when the cycloolefin copolymer measured in the crystallinity by X rays, the crystallinity is usually not more than 5%, and in most cases, 0%. Therefore, even when tried to be measured in the melting point using a differential scanning calorimeter (DSC), most of the cycloolefin copolymers are unmeasurable.

The cycloolefin type resin as mentioned above has such other features that a glass transition temperature (Tg) and a softening temperature (TMA) thereof are high. The glass transition temperature (Tg) of the cycloolefin type resin is usually not higher than 230° C., preferably in the range of 50° to 230° C., and in most cases, it is in the range of 100° to 200° C. In general, a cycloolefin type resin having a softening temperature of usually 70° to 180° C., preferably 90° to 180° C., is employed. A thermal decomposition temperature of the cycloolefin copolymer is usually in the range of 350° to 420° C., in most cases, 370° to 400° C. The cycloolefin copolymer has, as its mechanical properties, a tensile modulus of usually $1 \times 10^4$ to $5 \times 10^4$ kg/cm², and a tensile strength of usually 300 to 1,500 kg/cm². A density of the copolymer itself is usually in the range of 0.86 to 1.10 g/cm³, in most cases, 0.88 to 1.08 g/cm³.

The graft-modified cycloolefin copolymer (B-2) used as the modified polymer (B) in the invention is prepared by graft modifying the above-mentioned unmodified cycloolefin copolymer using unsaturated carboxylic acids, unsaturated carboxylic anhydrides or unsaturated carboxylic acid derivatives. Examples of the unsaturated carboxylic acids, the unsaturated carboxylic anhydrides and the unsaturated carboxylic acid derivatives used herein are the aforementioned graft modifiers used for modifying the unmodified α-olefin random elastic copolymer. These graft modifiers may be used singly or in combination.

Of the graft modifiers, the unsaturated carboxylic anhydrides are preferably used, and among these, maleic anhydride or nadic anhydride is particularly preferred.

For graft polymerization of the unmodified cycloolefin copolymer with the above-mentioned graft modifier, the same solution method or melting method as described for modifying the aforesaid α-olefin random elastic copolymer can be applied.

In the graft reaction, the amount of the graft modifier is determined in consideration of the reactivity of the graft modifier, but the amount thereof is usually in the range of 1 to 10 parts by weight per 100 parts by weight of the unmodified cycloolefin copolymer. In this graft reaction, radical initiators such as organic peroxides, organic peresters and azo compounds can be used, as described before.

Through the graft reaction, there can be obtained a graft-modified cycloolefin copolymer in which the graft modifier is graft polymerized in an an amount of usually 0.01 to 10 parts by weight, preferably 0.05 to 5 parts by weight, per 100 parts by weight of the unreacted cycloolefin copolymer.

By the use of the radical initiator in the graft reaction, graft efficiency can be improved. Examples of the radical initiator employable herein are conventionally known radical initiators such as organic peroxides, organic peresters and azo compounds. The radical initiator is used generally in an amount of 0.01 to 20 parts by weight based on 100 parts by weight of the unmodified cycloolefin copolymer.

The graft-modified aromatic vinyl type hydrocarbon/conjugated diene copolymer or its hydrogenation product (B-3) used as the modified polymer (B) in the invention is a graft-modified product of a random copolymer of aromatic vinyl type hydrocarbon and a conjugated diene compound or a block copolymer thereof, or a hydrogenation product of the random or block copolymer.

Concrete examples of the aromatic vinyl type hydrocarbon/conjugated diene copolymer or its hydrogenation product include styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber and styrene/butadiene random copolymer rubber.

In these copolymers, a molar ratio of repeating units derived from the aromatic vinyl type hydrocarbon to repeating units derived from the conjugated diene (aromatic vinyl type hydrocarbon/conjugated diene) is usually in the range of 10/90 to 70/30. The hydrogenated copolymer rubber is a copolymer obtained by hydrogenating a part of or all of double bonds remaining in the above-mentioned copolymer rubber.

An intrinsic viscosity [η] of the aromatic vinyl type hydrocarbon/conjugated diene copolymer or its hydrogenation product, as measured in decalin at 135° C., is generally in the range of 0.01 to 10 dl/g, preferably 0.08 to 7 dl/g, and a glass transition temperature (Tg) thereof is generally not higher than 0° C., preferably not higher than −10° C., particularly preferably not higher than −20° C. Further, a crystallinity thereof, as measured by means of X-ray diffractometry, is in the range of 0 to 10%, more preferably 0 to 7%, particularly preferably 0 to 5%.

The graft-modified aromatic vinyl type hydrocarbon/conjugated diene copolymer used in the invention is prepared by graft modifying the above-mentioned unmodified aromatic vinyl type hydrocarbon/conjugated diene copolymer using unsaturated carboxylic acids, unsaturated carboxylic anhydrides or unsaturated carboxylic acid derivatives in the similar manner to that for the preparation of the aforementioned graft-modified α-olefin random elastic copolymer (B-1).

Examples of the unsaturated carboxylic acids, the unsaturated carboxylic anhydrides and the unsaturated carboxylic acid derivatives employable herein are compounds (graft modifiers) used for preparing the aforesaid graft-modified α-olefin random elastic copolymer. These graft modifiers may be used singly or in combination.

Of the graft modifiers, the unsaturated carboxylic anhydrides are preferably used, and among these, maleic anhydride or nadic anhydride is particularly preferred.

For graft polymerization of the unmodified cycloolefin copolymer with the above-mentioned graft modifier, the same solution method or melting method as described for modifying the aforesaid α-olefin random elastic copolymer can be applied.

In the graft reaction, the amount of the graft modifier is determined in consideration of the reactivity of the graft modifier, but the amount thereof is usually in the range of 1 to 10 parts by weight per 100 parts by weight of the unmodified aromatic vinyl type hydrocarbon/conjugated diene copolymer or its hydrogenation product. In this graft reaction, radical initiators such as organic peroxides, organic peresters and azo compounds can be used, as described before.

Through the graft reaction, there can be obtained a graft-modified aromatic vinyl type hydrocarbon/conjugated diene copolymer or its hydrogenation product in which the graft modifier is graft polymerized in an an amount of usually 0.01 to 10 parts by weight, preferably 0.05 to 5 parts by weight, per 100 parts by weight of the unreacted aromatic vinyl type hydrocarbon/conjugated diene copolymer or its hydrogenation product.

The graft-modified aromatic vinyl type hydrocarbon/conjugated diene copolymer or its hydrogenation product obtained as above is a low-crystalline to non-crystalline copolymer, preferably substantially non-crystalline. That is, a graft-modified copolymer having a crystallinity, as measured by means of X-ray diffractometry, of not more than 10%, preferably not more than 7%, particularly preferably not more than 5%, is used. Most preferably, a graft-modified copolymer having a crystallinity of substantially 0% is used. Accordingly, most of the graft-modified aromatic vinyl type hydrocarbon/conjugated diene copolymers or their hydrogenation products show no definite melting point. Further, because of its low crystallinity, the graft-modified aromatic vinyl type hydrocarbon/conjugated diene copolymer or its hydrogenation product is soft, and has a tensile modulus of usually not less than 0.1 kg/cm² but less than 20,000 kg/cm², preferably in the range of 1 to 15,000 kg/cm².

A melt index (measured at 190° C.) of the graft-modified aromatic vinyl type hydrocarbon/conjugated diene copolymer or its hydrogenation product is usually in the range of 0.1 to 30 g/10 min, preferably 1.0 to 20 g/10 min, particularly preferably 2.0 to 15 g/10 min.

Moreover, a glass transition temperature (Tg) of the graft-modified aromatic vinyl type hydrocarbon/conjugated diene copolymer or its hydrogenation product is usually in the range of −150° to +50° C., preferably −80° to −20° C., and an intrinsic viscosity [η] thereof, as measured in decalin at 135° C., is usually in the range of 0.01 to 10 dl/g, preferably 1 to 5 dl/g.

By the use of the above-described graft-modified aromatic vinyl type hydrocarbon/conjugated diene copolymer or its hydrogenation product, a molded product having high toughness can be obtained.

For obtaining a molded product having excellent weather resistance, the hydrogenation product of the graft-modified aromatic vinyl type hydrocarbon/conjugated diene copolymer is preferably used.

Each of the aforesaid graft-modified α-olefin polymer (B-1) and the above-mentioned graft-modified aromatic vinyl type hydrocarbon/conjugated diene copolymer or its hydrogenation product (B-4) may be either a graft-modified product prepared by adjusting the amounts of the unmodified polymer and the modifier, etc. so as to obtain the desired modification rate, or a graft-modified product obtained by initially preparing a graft-modified product having high grafting rate and then diluting the product with an unmodified polymer so as to obtain the desired grafting rate.

The ethylene copolymer having a carboxyl group and a carboxylic metal salt group in the side chain (B-4) used as the modified polymer (B) in the invention comprises plural repeating units represented of the following formula [VI].

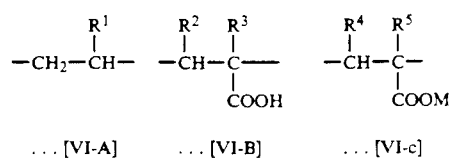

... [VI-A]    ... [VI-B]    ... [VI-c]

wherein $R^1$ to $R^5$ are each independently a hydrogen atom or an alkyl group of 1 to 5 carbon atoms, and M is a metallic ion of Group Ia, Ib, IIa, IIb or IIIa in the periodic table, concretely Na, K, Mg, Zn or the like.

The ethylene copolymer having a carboxyl group and a carboxylic metal salt group in the side chain (B-4)

can be prepared, for example, by copolymerizing ethylene with (meth)acrylic acid and then introducing the above metallic ion into a part of carboxyl groups of the resultant copolymer.

An example of the ethylene copolymer having a carboxyl group and a carboxylic metal salt group in the side chain (B-4) is an ionomer resin.

In the ethylene copolymer having a carboxyl group and a carboxylic metal salt group in the side chain, amounts of the repeating units represented by the above formulas [VI-A], [VI-B] and [VI-C] may be appropriately determined. The repeating unit represented by the formula [VI-B] is contained usually in an amount of 0.03 to 0.30 mol, and the repeating unit represented by the formula [VI-C] is contained usually in an amount of 0.01 to 0.20 mol, based on 1 mol of the repeating unit represented by the formula [VI-A].

In the present invention, the graft-modified α-olefin copolymer (B-1), the graft-modified product of cyclo-olefin copolymer (B-2), the graft-modified aromatic vinyl type hydrocarbon/conjugated diene copolymer or its hydrogenation product (B-3) and the ethylene copolymer containing a carboxyl group and a carboxylic metal salt in the side chain (B-4) may be used singly or in combination.

The modified polymer (B) may contain other polymers or copolymers than the above-mentioned ones, with the proviso that the properties of the resin are not marred.

It is preferable that the modified polymer (B) is contained in the resin components of the polyamide resin composition of the invention in an amount of 5 to 20% by weight. Especially when the content of this modified polymer (B) is preferably in the range of 5 to 15% by weight, more preferably 7 to 13% by weight, there can be obtained a composition capable of forming a molded product which has well balanced various properties such as toughness, heat resistance and low water absorption properties.

By the use of the above-described polymer (B), a connector can be efficiently inhibited in the reduction of toughness caused by heat deterioration.

The resin composition of the invention further contains aliphatic polyamide (C) as a resin component in addition to the above-mentioned aromatic polyamide (A) and modified polymer (B).

The aliphatic polyamide (C) used herein include:

(C-1) polyamide formed by polycondensation of an aliphatic dicarboxylic acid and aliphatic diamine, (C-2) polyamide formed by ring opening polymerization of lactams, and (C-3) polyamide formed from an aliphatic aminocarboxylic acid, aliphatic diamine and lactams.

The aliphatic polyamide generally has a structure represented by the following formula [V].

$—CH_2—CONH—CH_2—$      [V]

Concrete examples of the aliphatic polyamide include:

polyamides derived from aliphatic diamines and aliphatic dicarboxylic acids, such as polytetramethylene adipamide, polyhexamethylene adipamide, polyhexamethylene suberamide, polyhexamethylene sebacamide, polyhexamethylene undecanamide and polyhexamethylene dodecanamide; and polyamides derived from lactams or aminocarboxylic acids, such as polycaprolactam, polyundecanamide and polydodecanamide.

Of the above aliphatic polyamides, polycaprolactam (C-2) and polyundecanamide or polydodecanamide (C-3) are preferably used in the invention, from the view points of a thermal aging resistance required for a connector and a moldability of the composition.

This is because the aliphatic polyamides (C-2) and (C-3) tend to be present unchanged during blending with the aromatic polyamide (A) and the modified polymer (B), which may be confirmed by the observation of their individual peaks in a differential thermal analysis, so that they have a good influence on the moldability of the composition. On the other hand, the aliphatic polyamide (C-1) may interact with the aromatic polyamide (A) to take place a partial replacement between aliphatic and aromatic acid units during blending.

An intrinsic viscosity [η] of the aliphatic polyamide (C), as measured in a sulfuric acid at 30° C., is generally in the range of 0.3 to 4 dl/g, preferably 0.4 to 3 dl/g.

The above-mentioned aliphatic polyamide (C) is preferably contained in the resin components of the polyamide resin composition of the invention in an amount of 1 to 15% by weight. Especially when the content of this aliphatic polyamide (C) is preferably in the range of 1 to 10% by weight, more preferably 3 to 8% by weight, there can be obtained a composition capable of forming a molded product which has well balanced various properties such as toughness, heat resistance and low water absorption properties.

The resin composition of the invention contains the aromatic polyamide (A), the modified polymer (B) and the aliphatic polyamide (C) as described above, and it may further contain graft-modified crystalline polyolefin (F).

The graft-modified crystalline polyolefin (F) used herein is prepared by modifying crystalline polyolefin with a graft modifier.

The polyolefin used herein is crystalline, and has a crystallinity, as measured by means of X-ray diffractometry, of usually not less than 20%, preferably in the range of 30 to 80%. An intrinsic viscosity [η] of this crystalline polyolefin, as measured in decalin at 135° C., is usually in the range 0.1 to 30 dl/g, preferably 1 to 20 dl/g, particularly preferably 1.5 to 15 dl/g. A tensile modulus of this crystalline polyolefin is usually more than 2,000 kg/cm², preferably in the range of 3,000 to 30,000 kg/cm².

Examples of the crystalline polyolefin include a homopolymer of α-olefin having 2 to 20 carbon atoms and a copolymer of these α-olefins. Concretely, there can be mentioned polyethylene, polypropylene, linear low-density polyethylene, very low-density linear polyethylene (VLDPE), poly-1-butene, poly-1-pentene, poly-3-methyl-1-butene and poly-4-methyl-1-pentene.

The above-mentioned crystalline polyolefin is graft modified in the similar manner to that for preparing the aforesaid graft-modified α-olefin random elastic copolymer, to obtain the graft-modified crystalline polyolefin (F).

In the case of using the graft-modified crystalline polyolefin (F), the amount of this graft-modified crystalline polyolefin (F) in the resin components of the polyamide resin composition of the invention is preferably in the range of 1 to 20% by weight. Especially when the amount of this graft-modified crystalline polyolefin (F) is preferably in the range of 1 to 15% by weight, more preferably 3 to 12% by weight, a molded product excellent in various properties such as heat resistance and toughness can be prepared.

In the present invention, the total amount of the aromatic polyamide (A), the modified polymer (B), the aliphatic polyamide (C) and the graft-modified crystalline polyolefin (F) which is added if necessary is 100% by weight.

The polyamide resin composition of the invention further contains a specific hindered phenol type antioxidant (D) and a specific sulfur type antioxidant (E).

The hindered phenol type antioxidant (D) used in the invention has a molecular weight of not less than 500, preferably not less than 540, more preferably not less than 600. Further, the hindered phenol type antioxidant (D) has a 10% weight loss temperature of not lower than 300° C., preferably not lower than 320° C., more preferably not lower than 350° C., in a thermogram measured in air. The term "thermogram" used herein means a curve obtained by means of thermogravimetry (TGA) under the condition of a rate of temperature rise of 10° C./min using a thermal analysis device (model No. TG-DTA, produced by Rigaku Denki K.K.).

Examples of the hindered phenol type antioxidant having the above-mentioned properties include:

n-octadecyl-3-(4'-hydroxy-3',5'-di-tert-butylphenyl)-propionate (molecular weight: 530, TGA 10% weight loss temperature: 305° C.), 1,1,3-tris(2-methyl-4-hydroxy-5-tert-butylphenyl)butane (molecular weight: 544, TGA 10% weight loss temperature: 323° C.), 1,3,5-tris(4-tert-butyl-3-hydroxy-2,6-dimethylbenzyl)-s-triazine-2,4,6-(1H,3H,5H)-trione (molecular weight: 699, TGA 10% weight loss temperature: 354° C.).

1,3,5-trimethyl-2,4,6-tris(3,5-di-tert-butyl-4-hydroxyphenyl)benzylbenzene (molecular weight: 744, TGA 10% weight loss temperature: 338° C.), 1,3,5-tris(4-hydroxy-3,5-di-tert-butylbenzyl)-s-triazine-2,4,6-(1H,3H,5H)-trione (molecular weight: 783, TGA 10% weight loss temperature: 347° C.), ethylene glycol-bis[3,3-bis(3'-tert-butyl-4'-hydroxyphenyl)butyrate] (molecular weight: 794, TGA 10% weight loss temperature: 344° C.), tetrakis[methylene-3(3,5-di-tert-butyl-4-hydroxyphenyl)propionate]methane (molecular weight: 1,176, TGA 10% weight loss temperature: 355° C.), 3,9-bis[2-(3-(3-tert-butyl-4-hydroxy-5-methylphenyl)propionyloxy)-1,1-dimethylethyl]2,4,8,10-tetraoxaspiro[5,5]undecane (molecular weight: 741, TGA 10% weight loss temperature: 372° C.), 1,6-hexanediol-bis[3-(3,5-di-tert-butyl-4-hydroxyphenyl)propionate] (molecular weight: 639, TGA 10% weight loss temperature: 314° C.), triethylene glycol-bis[3-(3-tert-butyl-5-methyl-4-hydroxyphenyl)propionate] (molecular weight: 587, TGA 10% weight loss temperature: 311° C.), N,N'-hexamethylenebis(3,5-di-tert-butyl-4-hydroxycinnamamide) (molecular weight: 637, TGA 10% weight loss temperature: 330° C.), N,N'-bis[3-(3,5-di-tert-butyl-4-hydroxyphenyl)propionyl]hydrazine (molecular weight: 553, TGA 10% weight loss temperature: 304° C.), 2,2'-oxamide-bis-ethyl-3(3,5-di-tert-butyl-4-hydroxyphenyl)propionate (molecular weight: 697, TGA 10% weight loss temperature: 323° C.), 2,2'-methylene-bis(4-methyl-6-tert-butylphenol)-terephthalate (molecular weight: 810, TGA 10% weight loss temperature: 327° C.), 1,3,5-tris[(3,5-di-tert-butyl-4-hydroxyphenyl)propionyloxyethyl]isocyanurate (molecular weight: 1,045, TGA 10% weight loss temperature: 346° C.), and 2,2-bis[4-{2-(3,5-di-tert-butyl-4-hydroxyhydrocinnamoyloxy)}ethoxyphenyl]propane (molecular weight: 836).

These compounds may be used singly or in combination.

Of the above-mentioned hindered phenol type antioxidants, 3,9-bis[2-{3-(3-tert-butyl-4-hydroxy-5-methylphenyl)propionyloxy}-1,1-dimethylethyl]2,4,8,10-tetraoxaspiro[5,5]undecane, N,N'-hexamethylenebis{3,5-di-tert-butyl-4-hydroxycinnamamide) and n-octadecyl-3-(4'-hydroxy-3',5'-di-tert-butylphenyl)propionate are preferably used singly or in combination in the invention, and among these, 3,9-bis[2-{3-(3-tert-butyl-4-hydroxy-5-methylphenyl)propionyloxy}-1,1-dimethylethyl]2,4,8,10-tetraoxaspiro[5,5]undecane and/or N,N'-hexamethylenebis{3,5-di-tert-butyl-4-hydroxycinnamamide) are particularly preferred.

There are a variety of phenol type antioxidants other than the above-mentioned hindered phenol type antioxidant. In the case of using other phenol type antioxidant than the hindered phenol type antioxidant, however, heat stability of a molded product cannot be improved sufficiently.

Further, even if a hindered phenol type antioxidant having a molecular weight of less than 500 or having a 10% weight loss temperature of lower than 300° C. in the thermogram measured in air is used, the resultant composition loses the oxidation stabilizing function, because such hindered phenol type antioxidant is decomposed under heating during the preparation of the composition or the molding procedure of the composition. Moreover, since this decomposition of the antioxidant when heated causes foaming of the composition, a molded product formed from the composition tends to have defects.

The resin composition of the invention contains a sulfur type antioxidant as well as the above-mentioned hindered phenol type antioxidant.

The sulfur type antioxidant (E) used in the invention has a molecular weight of not less than 600, preferably not less than 620, more preferably not less than 650. Further, this sulfur type antioxidant (E) has a 10% weight loss temperature of not lower than 280° C., preferably not lower than 290° C., more preferably not lower than 300° C., in the thermogram measured in air.

Even if a sulfur type antioxidant having a molecular weight of less than 600 or having a 10% weight loss temperature of lower than 280° C. in the thermogram measured in air is used, the resultant composition loses the oxidation stabilizing function, because such sulfur type antioxidant is decomposed under heating during the preparation of the composition or the molding procedure of the composition. Moreover, since this decomposition of the antioxidant when heated causes foaming of the composition, a molded product formed from the composition tends to have defects.

The sulfur type antioxidant preferably used in the invention is a compound represented by the following formula [VI].

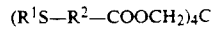

$(R^1S-R^2-COOCH_2)_4C$         [VI]

wherein $R^1$ is a hydrocarbon group generally having 3 to 20 carbon atoms, preferably 5 to 20 carbon atoms; $R^2$ is a divalent hydrocarbon group generally having 1 to 5 carbon atoms, preferably 1 to 3 carbon atoms; and four of sulfur-containing groups linked to a carbon atom may be the same or different from each other.

A concrete example of the compound represented by the above formula [VI] is penta(erythrityl-tetra-β-mercaptolauryl)propionate (molecular weight: 1,160, TGA 10% weight loss temperature: 300° C.).

Also employable as the sulfur type antioxidant other than the compound represented by the above formula [VI] is a compound represented by the following formula [VII].

$$S(R^4-COOR^3)_2 \quad [VII]$$

wherein $R^3$ is an alkyl group generally having 15 to 30 carbon atoms, preferably 18 to 30 carbon atoms; $R^3$ may contain a sulfur atom; and $R^4$ is a divalent aromatic group which may have an alkyl group, a divalent alicyclic alkyl group which may have an alkyl group, a divalent alkyl group or a single bond.

Concrete examples of the compound represented by the above formula [VII] include:

distearylthio-di-1,1'-methylpropionate (molecular weight: 696, TGA 10% weight loss temperature: 296° C.), myristylstearylthiodipropionate (molecular weight: 626, TGA 10% weight loss temperature: 284° C.), distearylthiodipropionate (molecular weight: 682, TGA 10% weight loss temperature: 292° C.), and distearylthiodibutyrate (molecular weight: 710, TGA 10% weight loss temperature: 296° C.).

Of the above-mentioned sulfur type antioxidants (E), penta(erythrityl-tetra-β-mercaptolauryl)propionate and distearylthiodipropionate are preferably used singly or in combination.

The total amount of the hindered phenol type antioxidant (D) and the sulfur type antioxidant (E) in the resin composition of the invention is preferably in the range of 0.2 to 4 parts by weight, and is more preferably in the range of 0.5 to 2 parts by weight, based on 100 parts by weight of the resin components. Further, a weight ratio between the hindered phenol type antioxidant (D) and the sulfur type antioxidant (E) [(D):(E)] in the resin composition of the invention is preferably in the range of 1:5 to 5:1, and the weight ratio is more preferably in the range of 1:3 to 3.5 to 1, particularly preferably in the range of 1:1 to 3:1.

The polyamide resin composition of the invention may further contain various additives such as inorganic fillers, organic fillers, heat stabilizers, weathering stabilizers, antistatic agents, slip inhibitors, anti-blocking agents, anti-fogging agents, lubricants, pigments, dyes, natural oils, synthetic oils and waxes, with the proviso that the properties of the composition are not marred.

For example, there can be mentioned glass fibers, carbon fibers and boron fibers as the inorganic fillers preferably used. Of these fibrous fillers, glass fibers are particularly preferred. By the use of the glass fibers, the composition can be improved in the moldability, and a connector formed from the composition can be improved in the mechanical properties such as tensile strength, flexural strength and flexural modulus and the heat resistance such as heat distortion temperature. The glass fibers have a mean length of usually 0.1 to 20 mm, preferably 0.3 to 6 mm, and an aspect ratio of usually 10 to 2,000, preferably 30 to 600. In the invention, the glass fibers having such mean length and aspect ratio as mentioned above are preferably used. The glass fibers are used generally in an amount of not more than 200 parts by weight, preferably in the range of 5 to 180 parts by weight, more preferably 5 to 150 parts by weight, based on 100 parts by weight of the resin components.

In addition to the inorganic fibrous fillers, there can be used fillers of other various forms such as those of particulate form, granular form, plate form, needle form, cross form and mat form.

Examples of such fillers include:

inorganic compounds such as silica, silica alumina, alumina, titanium oxide, talc, diatomaceous earth, clay, kaolin, glass, mica, gypsum, red oxide and zinc oxide, in the form of particle or plate;

inorganic compounds such as potassium titanium in the form of needle;

all aromatic polyamides such as polyparaphenylene terephthalamide, polymetaphenylene terephthalamide, polyparaphenylene isophthalamide, polymetaphenylene isophthalamide and condensates of diaminodiphenyl ether with terephthalic acids (or isophthalic acids), and condensates of para- (or meta-) aminobenzoic acids;

all aromatic polyamidoimide such as condensates of diaminodiphenyl ethers with trimellitic anhydrides or pyromellitic anhydrides;

heterocyclic ring-containing compounds such as all aromatic polyesters, all aromatic polyimides, polybenzimidazole and polyimidazophenanthroline; and polytetrafluoroethylene.

The above-mentioned fillers can be used in various forms such as forms of particle, plate, fiber and cross.

Of these fillers, particulate fillers are preferably used, and among these, talc is particularly preferred.

The above fillers may be used as a mixture of two or more kinds. Further, they can be used after treated with silane coupling agents or titanium coupling agents. A mean particle diameter of the particulate fillers is usually in the range of 0.1 to 200 μm, preferably 1 to 100 μm.

The particulate filler is used generally in an amount of not more than 200 parts by weight, preferably not more than 100 parts by weight, particularly preferably in the range of 0.5 to 50 parts by weight, based on 100 parts by weight of the resin components.

The composition of the invention may furthermore contain heat-resistant resins, with the proviso that the properties of the composition are not marred. Examples of the heat-resistant thermoplastic resins include PPS (polyphenylene sulfide), PPE (polyphenylene ether), PES (polyether sulfone), PEI (polyether imide) and LCP (liquid crystal polymer). Also employable are modified products of these resins. In the invention, polyphenylene ether and polyphenylene sulfide are particularly preferably used. The content of the heat-resistant thermoplastic resin in the composition is usually less than 50% by weight, preferably in the range of 0 to 40% by weight.

The polyamide resin composition of the invention can be prepared, for example, by mixing the aromatic polyamide (A), the modified polymer (B), the aliphatic polyamide (C), the specific hindered phenol type antioxidant (D) and the specific sulfur type antioxidant (E) and if necessary the graft-modified crystalline polyolefin (F) and various additives, and then kneading the resultant mixture. The temperature in the kneading procedure is generally not lower than a melting point of a resin having the highest melting point, namely, a temperature not lower than a melting point of the aromatic polyamide (A). For kneading of the mixture, a known melt-kneading device can be used.

Through the kneading, a dispersion wherein the modified polymer (B) and the aliphatic polyamide (C) are finely dispersed in the aromatic polyamide (A), so-called "polymer alloy", is formed.

The polyamide resin composition of the invention comprising the aromatic polyamide (A), the modified polymer (B), the aliphatic polyamide (C), the specific hindered phenol type antioxidant (D) and the specific sulfur type antioxidant (E) is free from foaming during the preparation of the composition, has no evil effect of metal and is free from gas burning during the molding procedure of the composition. Moreover, a molded product formed from this composition is excellent in heat resistance, low water absorption properties and thermal aging resistance.

The polyamide resin composition comprising such components as mentioned above has a heat distortion temperature (measured under a load of 18.6 kg) of usually 70° to 150° C., preferably 80° to 120° C., and this resin composition shows prominently high heat resistance though the polyamide resin composition is thermoplastic.

Further, this resin composition has a specific gravity of usually 1.05 to 1.12, and in most cases, about 1.08 to 1.10. Accordingly, as is evident from the comparison with polybutylene terephthalate having a specific gravity of about 1.31 or nylon 66 having a specific gravity of about 1.14, which has been relatively widely used as a resin for preparing a connector, a molded product (e.g., connector) formed from the resin composition of the invention is lightweight.

Next, a connector of the present invention is described below.

The connector of the invention has housing made of the polyamide resin composition which is described in detail hereinbefore.

Figure 2:
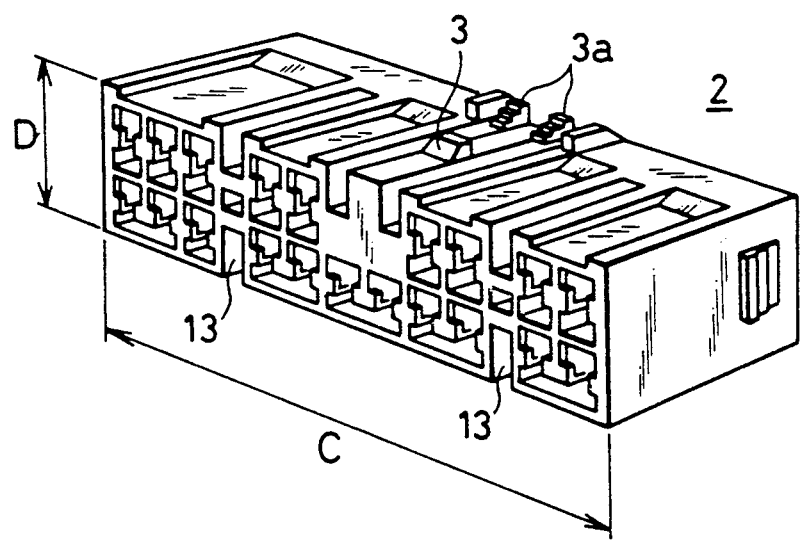
FIG. 2 is a perspective view showing one example of male housing of a connector according to the present invention.
Figure 3:
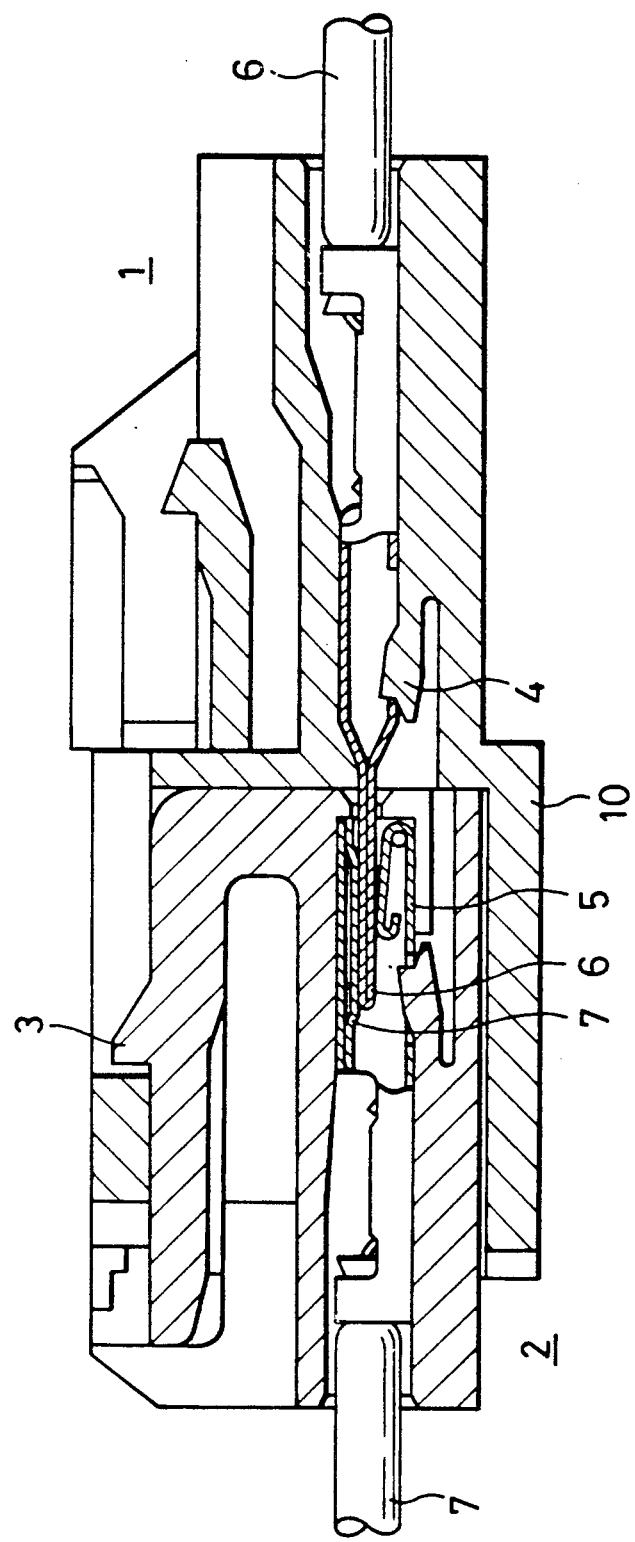
FIG. 3 is a schematic sectional view of a connector according to the present invention.

FIGS. 1, 2 and 3 are each a schematic view illustrating a connector of the present invention.

As shown in FIGS. 1, 2 and 3, the connector of the invention basically comprises a female housing 1 and a male housing 2. The female housing 1 has a male terminal 6 and an angularly tubular portion 10. The male housing 2 has a female terminal 7 and is to be inserted into the angularly tubular portion 10 of the female housing 1 to connect both housings to each other.

In the female housing 1, as shown in FIG. 3, an intermediate portion of the male terminal 6 is held by means of a male terminal holding arm 4, and a tip of the male terminal 6 projects into the angularly tubular portion 10. On the upper face of the angularly tubular portion 10 is formed a cutaway portion 11 which is engaged and locked with a lock arm 3 of the male housing 2 described below to prevent the male housing 2 from slipping out. Further, as shown in FIG. 1, a plurality of guiding protrusions 12 are formed on the upper and lower inner surfaces of the angularly tubular portion 10.

In the male housing 2, as shown in FIG. 3, a tip of the female terminal 7 is held by means of a female terminal holding arm 5 and is formed to be engaged with the tip of the male terminal 6. When the tip of the female terminal 7 is engaged with the tip of the male terminal 6, both terminals are electrically connected to each other. On the top of the male housing 2 is formed a lock arm 3, and this lock arm 3 is provided with a press portion 3a to press down the lock arm 3. The lock arm 3 is engaged and locked with the cutaway portion 11 of the female housing 1 to prevent the male housing 2 from slipping out. When the press portion 3a is pressed down by an operator, the locked state (engaged state) between the lock arm 3 and the cutaway portion 11 is cancelled so as to unfix the two housings from each other. As shown in FIG. 2, on the upper and lower outer surfaces of the male housing 2 are formed a plurality of guiding grooves 13 which are to be engaged with the guiding protrusions 12 of the female housing 1.

Since the connector has such a structure as mentioned above, the male housing 2 is inserted into the angularly tubular portion 10 of the female housing 1 to fix the both housings to each other so as to make the connector connected. By this operation, the lock arm 3 is elastically deformed to be engaged and locked with the cutaway portion 11 of the angularly tubular portion 10, and thereby the male housing 2 is prevented from slipping out from the female housing 1. At the same time, the tip of the female terminal 7 is engaged with the tip of the male terminal 6 to electrically connect the both terminals. On the other hand, for separating the connector, the press portion 3a is pressed down to cancel the engagement between the lock arm 3 and the cutaway portion 11 and to unfix the both housings from each other, whereby the male housing 2 is drawn out from the female housing 1.

In the preparation of the connector of the invention, the polyamide resin composition of the invention is first prepared by mixing and kneading the aromatic polyamide (A), the modified polymer (B), the aliphatic polyamide (C), the graft-modified crystalline polyolefin (F), if necessary, the specific hindered phenol type antioxidant (D), the specific sulfur type antioxidant (E), etc. In this procedure, known kneading devices such as an extruder and a kneader can be used.

Then, the resin composition of the present invention is molded into such a connector body as shown in FIGS. 1 to 3 by a method conventionally used such as an injection molding method.

The connector of the invention can be used as a conventional connector, but it is particularly suitable as a connector employable under such conditions that heating and cooling are repeatedly carried out, for example, as a connector employable within an automotive engine room. That is, the connector of the invention not only has excellent heat resistance but also is hardly reduced in toughness after temporarily heated. When used in an automotive engine room, the conventional connector is reduced in toughness to cause reduction of durability. However, the connector of the invention is hardly reduced in the toughness, and the elongation rate required for a connector can be kept even after the connector is heated.

Recently, electrical parts equipped with a connector come to be often used by soldering them utilizing an infrared reflow method or the like, and hence the conventional connector is sometimes reduced in toughness by the heat of the infrared reflow method. In accordance with reduction of toughness, the elongation rate of the connector lowers, and thereby a connecting operation (fitting operation) of connectors cannot be smoothly carried out in some cases. However, by the use of the connector of the invention, this connecting operation can be easily carried out, and the durability can be also improved.

EFFECT OF THE INVENTION

The polyamide resin composition of the present invention comprises the aromatic polyamide (A), the modified polymer (B), the aliphatic polyamide (C), the specific hindered phenol type antioxidant (D) and the specific sulfur type antioxidant (E). As described above, the specific hindered phenol type antioxidant (D) and the specific sulfur type antioxidant (E) are used in combination in a resin composition containing aromatic polyamide as its host component, and hence the resin composition of the invention is much more improved in the heat resistance as compared with resin compositions containing various conventional antioxidants.

Accordingly, the connector of the invention which has housing formed from this polyamide resin composition is prominently excellent in the heat resistance and hardly reduced in toughness even after exposed to a high temperature for a long period of time.

Further, the polyamide resin composition for forming the connector of the invention is lower in the specific gravity than a resin for forming a conventional connector, so that the connector formed from this present resin composition can be made more lightweight.

Furthermore, since the resin composition for the connector of the invention has a low water absorption rate and high chemical resistance, the connector formed from the resin composition shows high dimensional stability even when contacted with water. Especially when used in an automotive engine room, the connector is brought into contact with lubricating oils as well as antifreezing agents (e.g., potassium chloride) scattered on road for preventing freezing of road surface. However, even when the connector of the invention is contacted those oils and agents, cracks hardly take place on the connector.

Moreover, since the resin composition of the invention is excellent in flowability, a cycle for preparing a molded product from the resin composition can be made shorter, and hence the connector of the invention can be produced with high productivity.

EXAMPLE

The present invention is further described with reference to examples, but it should be construed that the invention is in no way limited to those examples.

Starting materials used in the following examples are given below.

Aromatic Polyamide (A-1): a polyamide resin derived from 1,6-diaminohexane, a terephthalic acid and an adipic acid (molar ratio between the terephthalic acid and the adipic acid=55:45).

Physical properties of this polyamide resin (A-1) are as follows.

Intrinsic viscosity (measured in a concentrated sulfuric acid at 30° C.): 1.02 dl/g.

Melting point: 312° C.

Glass transition temperature: 80° C.

(A-2): a polyamide resin derived from 1,6-diaminohexane, a terephthalic acid and an adipic acid (molar ratio between the terephthalic acid and the adipic acid=45:55).

Physical properties of this polyamide resin (A-2) are as follows.

Intrinsic viscosity (measured in a concentrated sulfuric acid at 30° C.): 1.00 dl/g.

Melting point: 305° C.

Glass transition temperature: 77° C.

Aliphatic Polyamide (C-No.1): nylon 11 (Rylsan BMNO, available from Toray Industries, Inc.).

(C-No.2): nylon 66 (CM3001N, available from Toray Industries, Inc.).

Hindered Phenol Type Antioxidant (D-1): 3,9-bis[2-{3-(3-tert-butyl-4-hydroxy-5-methylphenyl)propionyloxy}-1,1-dimethylethyl]2,4,8,10-tetraoxaspiro[5,5]undecane (molecular weight: 741, TGA 10% weight loss temperature: 372° C.).

Sulfur Type Antioxidant (E-1): penta(erythrityl-tetra-$\beta$-mercaptolauryl)propionate (molecular weight: 1,160, TGA 10% weight loss temperature: 300° C.).

(E'-2): ditridecylthiopropionate (molecular weight: 542, TGA 10% weight loss temperature: 273° C.).

SYNTHESIS EXAMPLE

Preparation of Graft-Modified Polymer (B-No.1)

A hydrogenated styrene/butadiene/styrene block copolymer (styrene content: 30% by weight, trade name: Taftec H1041, available from Asahi Kasei Kogyo K.K.) obtained by hydrogenating a styrene/butadiene/styrene block copolymer is modified with maleic anhydride to obtain a maleic anhydride graft-modified hydrogenated styrene/butadiene/styrene block copolymer (B-No.1). In this copolymer, the grafting amount of the maleic anhydride was 1.63% by weight.

Preparation of Graft-Modified Cycloolefin Polymer (B-No.2)

To 5 kg of a random copolymer of ethylene and 1,4,5,8-dimethano-1,2,3,4,4a,5,8,8a-octahydronaphthalene (another name: tetracyclo[4.4.0.1$^{2,5}$.1$^{7,10}$]-3-dodecene, sometimes abbreviated to "DMON" hereinafter) having an ethylene content (measured by $^{13}$C-NMR) of 62% by mol, MFR (260° C.) of 15 g/10 min, an intrinsic viscosity [$\eta$] (as measured in decalin at 135° C.) of 0.6 dl/g and a glass transition temperature of 130° C. were added a solution comprising 50 g of maleic anhydride and 25 g of acetone and 3 g of organic peroxide (Perhexyne 25B ™, available from Nippon Yushi K.K.), and they were well mixed. The resultant mixture was melted by means of a twin-screw extruder (PCM 45, produced by Ikegai Tekko K.K.) at a cylinder temperature of 250° C. to perform a reaction. The obtained reaction product was pelletized using a pelletizer.

The resin thus obtained had a maleic acid content of 0.8% by weight, an intrinsic viscosity [$\eta$] as measured in decalin at 135° C. of 0.42 dl/g, and a glass transition temperature of 145° C.

Properties of this graft-modified cycloolefin polymer (B-No.2) were measured on the following test items.

Tensile strength (TS): measured in accordance with ASTM-D-638.

Elongation at break (EL): measured in accordance with ASTM-D-638.

Flexural strength: measured in accordance with ASTM-D-790.

Flexural modulus: measured in accordance with ASTM-D-790.

Izod impact strength: measured in accordance with ASTM-D-256 (with notch, temperature of measurement: 23° C.).

Heat distortion temperature (HDT): measured in accordance with ASTM-D-648.

The results are set forth in Table A.

TABLE A

| Properties | Property value |
|---|---|
| Tensile strength at break (kg/cm$^2$) [23° C., absolute dryness] | 610 |
| Elongation at break (%) [23° C., absolute dryness] | 3 |
| Flexural strength (kg/cm$^2$) [23° C., absolute dryness] | 1,100 |
| Flexural modulus (kg/cm$^2$) [23° C., absolute dryness] | 32,000 |
| Izod impact strength (kg · cm/cm) [23° C., with notch] | 3 |
| Heat distortion temperature (°C.) [load: 264 psi] | 125 |
| Water absorption rate (%) 1 day in water at 23° C. | <0.01 |

EXAMPLES 1–3, COMPARATIVE EXAMPLES 1–3

The aromatic polyamide (A-1) or (A-2), the graft-modified copolymers (B-No.1) and (B-No.2) prepared by synthesis example, the aliphatic polyamides (C-No.1) and (C-No.2), the hindered phenol type antioxidant (D-1) and the sulfur type antioxidant (E-1) or (E'-2) were mixed in amounts set forth in Table 1. The resulting mixture was melted and kneaded in a twin-screw extruder, and then pelletized. The twin-screw extruder used herein was PCM-45 produced by Ikegai Tekko K.K., and the cylinder temperature was set to 320° C.

Using the pellets obtained as above, an injection-molded specimen was prepared. The tensile strength (TS) and elongation at break (EL) of the specimen were measured in the same manner as described above.

Further, the specimen was measured on a change of the tensile strength (TS) with time and a change of the elongation at break (EL) with time when heated at 150° C. The results are set forth in Table 1.

TABLE 1

|  | Example | | | Comparative example | | |
|---|---|---|---|---|---|---|
|  | 1 | 2 | 3 | 1 | 2 | 3 |
| Aromatic polyamide (A-1) or (A-2) | (A-1) 75 | (A-1) 75 | (A-2) 60 | — | — | — |
| Modified polymer | | | | | | |
| (B-No. 1) | 20 | 20 | 20 | 20 | 20 | 20 |
| (B-No. 2) | — | — | 15 | — | — | — |
| Aliphatic polyamide | | | | | | |
| (C-No. 1) = nylon 11 | 5 | 5 | 2 | 5 | 5 | 5 |
| (C-No. 2) = nylon 66 | — | — | — | 75 | 75 | 75 |
| Hindered phenol antioxidant (D-1) Mw = 741, TGA = 272° C. | 0.5 | 0.75 | 0.5 | 0.5 | 0.5 | — |
| Sulfer antioxidant | | | | | | |
| (E-1) Mw = 1160, TGA = 300° C. | 0.5 | 0.25 | 0.5 | 0.5 | — | 0.5 |
| (E'-2) Mw = 542, TGA = 273° C. | — | — | — | — | 0.5 | — |
| Other antioxidant Phosphorus antioxidant PEP-36 | — | — | — | — | — | 0.5 |
| Initial physical properties | | | | | | |
| TS (kg/cm$^2$) | 550 | 550 | 550 | 520 | 530 | 550 |
| EL (%) | 50 | 50 | 25 | >50 | 40 | 50 |
| Thermal aging at 150° C. | | | | | | |
| Physical properties after 600 hours | | | | | | |
| TS (kg/cm$^2$) | 580 | 580 | 550 | 530 | 560 | 580 |
| EL (%) | 50 | 50 | 15 | 8 | 10 | 17 |
| Physical properties after 1,000 hours | | | | | | |
| TS (kg/cm$^2$) | 580 | 600 | — | 500 | 550 | 580 |
| EL (%) | 15 | 10 | — | 4 | 5 | 12 |
| State of composition | good | good | good | good | good | foamed |

Using the pellets obtained in the above, housings for a connector shown in FIGS. 1 to 3 were prepared, and using these housings, a connector was prepared.

The connector was evaluated on the following properties.

(1) Lightweight Properties

The lightweight properties of the connector obtained as above was evaluated by measuring a specific gravity by means of a method of displacement in water.

(2) Toughness

The toughness of the connector was evaluated by measuring Izod impact strength (ASTM-D-256, measuring temperature: 23° C., with notch).

(3) Dimensional Change Caused by Water Absorption

The connector was subjected to moistening at 35° C. and 95% RH until the water absorption amount became saturated, and portions of A, B, C and D in FIGS. 1 and 2 were measured on the dimensional change. Then, a rate of change of the dimension just after the molding procedure against the dimension after the moistening treatment was calculated by the following formula.

$$\frac{\text{Dimension of each portion after moistening} - \text{Dimension of each portion just after molding}}{\text{Dimension of each portion just after molding}} \times 100$$

(4) Heat Resistance

The connector was heated at 120° C. for 1,000 hours, and a terminal having been contact-bonded with an electric wire having a length of about 100 mm was fixed to the housing of the connector. Then, the electric wire was drawn in the axial direction at a constant rate of about 100 mm/min, and a load under which the terminal was drawn out from the housing was measured. Further, a change of appearance of the connector was also observed. The connector just after the molding procedure was also evaluated in the same manner as described above.

(5) Flowability

The flowability of the resin composition at a molding temperature of 280° to 350° C. was measured.

(6) Fitting Properties

The connector was subjected to moistening at 30° C. and 95% RH until the water absorption amount became saturated. Then, when the male connector and the female connector were fitted to each other in a non-acoustic box, a level of a sound generated when they were fitted was measured by a sound-level meter. Thereafter, the sound level thus measured was analyzed on the frequency using an analyzing recorder (produced by Yokokawa Hokushin Denki K.K.) to evaluate fitting properties of the connector. It can be judged that a connector generating a high sound level is good in the fitting properties.

(7) Terminal Holding Power

The results are set forth in Table 2.

TABLE 2

|  | Example | | | Comp. Example | | |
|---|---|---|---|---|---|---|
|  | 1 | 2 | 3 | 1 | 2 | 3 |
| Lightweight properties (specific gravity) | 1.10 | 1.10 | 1.08 | 1.10 | 1.10 | 1.10 |
| Toughness (Izod impact strength) | BB | BB | BB | BB | BB | BB |
| Heat resistance | AA | AA | AA | BB | BB | BB |
| Moisture absorption dimensional stability | AA | AA | AA | CC | AA | AA |
| Flowability | AA | AA | AA | AA | AA | AA |
| Fitting sound after moisture absorption | AA | AA | AA | CC | AA | AA |
| Terminal holding power (Kg) | 8 | 8 | 8 | 8 | 8 | 8 |

In Table 2, methods of evaluating the properties and meanings of the symbols are as follows.

Toughness: evaluated by measuring Izod impact strength (ASTM-D-256, measuring temperature: 23° C., with notch).
 AA: not less than 10 kg.cm/cm
 BB: 6-10 kg.cm/cm
 CC: not more than 6 kg.cm/cm
Heat resistance: evaluated by examining thermal aging resistance after heating at 130° C. for 1,000 hours.
 AA: very good
 BB: good
 CC: insufficient
Moisture absorption dimensional stability: evaluated by measuring a rate of dimensional change.
 AA: not more than 0.33
 BB: 0.15-0.33
 CC: not more than 0.15
Flowability: evaluated by measurin in the molding procedure at a temperature of 280° to 350° C.
 AA: good
 BB: difficult molding
Fitting sound after moisture absorption: evaluated by measuring a level of a sound generated when the connector is fitted after moisture absorption.
 AA: not less than 500 MHz
 BB: 100-500 MHz
 CC: not more than 100 MHz
Terminal holding power
 not less than 6 kg: good
 4-6 kg: normal
 not more than 4 kg: insufficient

What is claimed is:

1. A polyamide resin composition comprising resin components and antioxidants,
 said resin components comprising:
 (A) aromatic polyamide in an amount of 50 to 85% by weight, which comprises repeating units formed from dicarboxylic acid constituent units and diamine constituent units, said dicarboxylic acid constituent units comprising 40-100% by mol of terephthalic acid constituent units, 0-50% by mol of aromatic dicarboxylic acid constituent units other than terephthalic acid constituent units and/or 0-60% by mol of aliphatic dicarboxylic acid constituent units having 4 to 20 carbon atoms, said diamine constituent units comprising aliphatic diamine constituent units and/or alicyclic diamine constituent units,
 said aromatic polyamide having an intrinsic viscosity, as measured in a concentrated sulfuric acid at 30° C., of 0.5 to 3.0 dl/g and a melting point of higher than 290° C.;
 (B) at least one modified polymer selected from the group consisting of a graft-modified α-olefin polymer, a graft-modified product of a cycloolefin copolymer which is an addition polymer of cycloolefin and ethylene, a graft-modified aromatic vinyl type hydrocarbon/conjugated diene copolymer, a hydrogenation product of this copolymer and an ethylene copolymer containing a carboxyl group and a carboxylic metal salt in the side chain, in an amount of 10 to 40% by weight, wherein said graft-modified polymers have been graft-modified with a modifier selected from the group consisting of an unsaturated carboxylic acid, an unsaturated carboxylic acid anhydride, an unsaturated carboxylic acid halide, an unsaturated carboxylic acid imide and an unsaturated carboxylic acid ester; and
 (C) aliphatic polyamide in an amount of 1 to 15% by weight;
 said antioxidants comprising:
 (D) a hindered phenol type antioxidant having a molecular weight of not less than 500 and a 10% weight loss temperature of not lower than 300° C. in a thermogram measured in air; and
 (E) a sulfur type antioxidant having a molecular weight of not less than 600 and a 10% weight loss temperature of not lower than 280° C. in a thermogram measured in air;
 wherein, the total amount of the hindered phenol type antioxidant (D) and the sulfur type antioxidant (E) is in the range of 0.2 to 4 parts by weight based on 100 parts by weight of the resin components, and a weight ratio between the hindered phenol type antioxidant (D) and the sulfur type antioxidant (E) is in the range of 1:5 to 5:1.

2. The polyamide resin composition as claimed in claim 1, said polyamide resin composition further comprising (F) graft-modified crystalline polyolefin in an amount of 1 to 20% by weight as the resin component wherein said graft-modified crystalline polyolefin has been graft-modified with a modifier selected from the group consisting of an unsaturated carboxylic acid, an unsaturated carboxylic acid anhydride, an unsaturated carboxylic acid halide, an unsaturated carboxylic acid imide and an unsaturated carboxylic acid ester.

3. The polyamide resin composition as claimed in claim 1 or claim 2, wherein the hindered phenol type antioxidant (D) is 3,9-bis[2-{3-(3-tert-butyl-4-hydroxy- 5-methylphenyl)propionyloxy}-1,1-dimethylethyl]-2,4,8,10-tetraoxaspiro[5,5]undecane and/or N,N'-hexamethylenebis(3,5-di-tert-butyl-4-hydroxycinnamamide).

4. The polyamide resin composition as claimed in claim 1 or claim 2, wherein the sulfur type antioxidant (E) is a compound represented by the following formula [VI]:

$$(R^1S-R^2-COOCH_2)_4C \qquad [VI]$$

wherein $R^1$ is a hydrocarbon group of 3 to 20 carbon atoms, and $R^2$ is a divalent hydrocarbon group of 1 to 5 carbon atoms.

5. The polyamide resin composition as claimed in claim 1 or claim 2, wherein the sulfur type antioxidant (E) is penta(erythrityl-tetra-β-mercaptolauryl)propionate.

6. A connector having housing made of a polyamide resin composition comprising resin components and antioxidants, said resin components comprising:

(A) aromatic polyamide in an amount of 50 to 85% by weight, which comprises repeating units formed from dicarboxylic acid constituent units and diamine constituent units, said dicarboxylic acid constituent units comprising 40-100% by mol of terephthalic acid constituent units, 0-50% by mol of aromatic dicarboxylic acid constituent units other than terephthalic acid constituent units and/or 0-60% by mol of aliphatic dicarboxylic acid constituent units having 4 to 20 carbon atoms, said diamine constituent units comprising aliphatic diamine constituent units and/or alicyclic diamine constituent units, said aromatic polyamide having an intrinsic viscosity, as measured in a concentrated sulfuric acid at 30° C., of 0.5 to 3.0 dl/g and a melting point of higher than 290° C.;

(B) at least one modified polymer selected from the group consisting of a graft-modified α-olefin polymer, a graft-modified product of a cycloolefin copolymer which is an addition polymer of cycloolefin and ethylene, a graft-modified aromatic vinyl type hydrocarbon/conjugated diene copolymer, a hydrogenation product of this copolymer and an ethylene copolymer containing a carboxyl group and a carboxylic metal salt in the side chain, in an amount of 10 to 40% by weight, wherein said graft-modified polymers have been graft-modified with a modifier selected from the group consisting of an unsaturated carboxylic acid, an unsaturated carboxylic acid anhydride, an unsaturated carboxylic acid halide, an unsaturated carboxylic acid imide and an unsaturated carboxylic acid ester; and (C) aliphatic polyamide in an amount of 1 to 15% by weight;

said antioxidants comprising:

(D) a hindered phenol type antioxidant having a molecular weight of not less than 500 and a 10% weight loss temperature of not lower than 300° C. in a thermogram measured in air; and (E) a sulfur type antioxidant having a molecular weight of not less than 600 and a 10% weight loss temperature of not lower than 280° C. in a thermogram measured in air;

wherein, the total amount of the hindered phenol type antioxidant (D) and the sulfur type antioxidant (E) is in the range of 0.2 to 4 parts by weight based on 100 parts by weight of the resin components, and a weight ratio between the hindered phenol type antioxidant (D) and the sulfur type antioxidant (E) is in the range of 1:5 to 5:1.

7. The connector as claimed in claim 6, wherein the polyamide resin composition further comprises (F) graft-modified crystalline polyolefin in an amount of 1 to 20% by weight as the resin component wherein said graft-modified crystalline polyolefin has been graft-modified with a modifier selected from the group consisting of an unsaturated carboxylic acid, an unsaturated carboxylic acid anhydride, an unsaturated carboxylic acid halide, an unsaturated carboxylic acid imide and an unsaturated carboxylic acid ester.

8. The connector as claimed in claim 6 or claim 7, wherein the hindered phenol type antioxidant (D) is 3,9-bis[2-{3-(3-tert-butyl-4-hydroxy-5-methylphenyl)-propionyloxy}-1,1-dimethylethyl]-2,4,8,10-tetraoxaspiro[5,5]undecane and/or N,N'-hexamethylenebis(3,5-di-tert-butyl-4-hydroxycinnamamide).

9. The connector as claimed in claim 6 or claim 7, wherein the sulfur type antioxidant (E) is a compound represented by the following formula [VI]:

$$(R^1S-R^2-COOCH_2)_4C \qquad [VI]$$

wherein $R^1$ is a hydrocarbon group of 3 to 20 carbon atoms, and $R^2$ is a divalent hydrocarbon group of 1 to 5 carbon atoms.

10. The connector as claimed in claim 6 or claim 7, wherein the sulfur type antioxidant (E) is penta(erythrityl-tetra-β-mercaptolauryl)propionate.

* * * * *